US007312785B2

(12) United States Patent
Tsuk et al.

(10) Patent No.: US 7,312,785 B2
(45) Date of Patent: Dec. 25, 2007

(54) METHOD AND APPARATUS FOR ACCELERATED SCROLLING

(75) Inventors: Robert W. Tsuk, Cupertino, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 10/256,716

(22) Filed: Sep. 26, 2002

(65) Prior Publication Data

US 2003/0076301 A1    Apr. 24, 2003

Related U.S. Application Data

(60) Provisional application No. 60/387,692, filed on Jun. 10, 2002, provisional application No. 60/359,551, filed on Feb. 25, 2002, provisional application No. 60/346,237, filed on Oct. 22, 2001.

(51) Int. Cl.
*G09G 5/00* (2006.01)
(52) U.S. Cl. .................. 345/156; 345/684; 345/838; 345/168; 345/163
(58) Field of Classification Search ............... 345/684, 345/838, 784–785, 168, 163, 156
See application file for complete search history.

(56) References Cited

U.S. PATENT DOCUMENTS

| 1,061,578 | A | 5/1913 | Wischhusen et al. |
| 2,798,907 | A | 7/1957 | Schneider |
| 2,903,229 | A | 9/1959 | Landge |
| 2,945,111 | A | 7/1960 | McCormick |
| 3,005,055 | A | 10/1961 | Mattke |
| 3,965,399 | A | 6/1976 | Walker et al. |
| 4,103,252 | A | 7/1978 | Bobick |
| 4,110,749 | A | 8/1978 | Janko et al. |
| 4,121,204 | A | 10/1978 | Welch et al. |
| 4,129,747 | A | 12/1978 | Pepper, Jr. |
| 4,158,216 | A | 6/1979 | Bigelow |
| 4,246,452 | A | 1/1981 | Chandler |

(Continued)

FOREIGN PATENT DOCUMENTS

DE          3615742          11/1987

(Continued)

OTHER PUBLICATIONS

"About Quicktip®" www.logicad3d.com/docs/qt.html, downloaded Apr. 8, 2002.

(Continued)

*Primary Examiner*—Richard Hjerpe
*Assistant Examiner*—Leonid Shapiro

(57) ABSTRACT

Improved approaches for users to with graphical user interfaces of computing devices are disclosed. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed.

40 Claims, 15 Drawing Sheets

U.S. PATENT DOCUMENTS

| | | | |
|---|---|---|---|
| 4,264,903 A | 4/1981 | Bigelow | |
| 4,293,734 A | 10/1981 | Pepper, Jr. | |
| 4,380,007 A | 4/1983 | Steinegger | |
| 4,380,040 A | 4/1983 | Posset | |
| 4,475,008 A | 10/1984 | Doi et al. | |
| 4,570,149 A | 2/1986 | Thornburg et al. | |
| 4,587,378 A | 5/1986 | Moore | |
| 4,644,100 A | 2/1987 | Brenner et al. | |
| 4,719,524 A * | 1/1988 | Morishima et al. | 360/73.05 |
| 4,734,034 A | 3/1988 | Maness et al. | |
| 4,736,191 A * | 4/1988 | Matzke et al. | 341/20 |
| 4,739,299 A | 4/1988 | Eventoff et al. | |
| 4,752,655 A | 6/1988 | Tajiri et al. | |
| 4,755,765 A | 7/1988 | Ferland | |
| 4,764,717 A | 8/1988 | Tucker et al. | |
| 4,798,919 A | 1/1989 | Miessler et al. | |
| 4,810,992 A | 3/1989 | Eventoff | |
| 4,831,359 A | 5/1989 | Newell | |
| 4,849,852 A | 7/1989 | Mullins | |
| 4,856,993 A | 8/1989 | Maness et al. | |
| 4,866,602 A | 9/1989 | Hall | |
| 4,897,511 A | 1/1990 | Itaya et al. | |
| 4,914,624 A | 4/1990 | Dunthorn | |
| 4,917,516 A | 4/1990 | Retter | |
| 4,951,036 A | 8/1990 | Grueter et al. | |
| 4,990,900 A | 2/1991 | Kikuchi | |
| 5,008,497 A | 4/1991 | Asher | |
| 5,036,321 A | 7/1991 | Leach et al. | |
| 5,125,077 A | 6/1992 | Hall | |
| 5,159,159 A | 10/1992 | Asher | |
| 5,179,648 A * | 1/1993 | Hauck | 345/684 |
| 5,186,646 A | 2/1993 | Pederson | |
| 5,231,326 A | 7/1993 | Echols | |
| 5,237,311 A | 8/1993 | Mailey et al. | |
| 5,305,017 A | 4/1994 | Gerpheide | |
| D349,280 S | 8/1994 | Kaneko | |
| 5,339,213 A | 8/1994 | Ocallaghan | |
| 5,367,199 A | 11/1994 | Lefkowitz et al. | |
| 5,374,787 A | 12/1994 | Miller et al. | |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| D362,431 S | 9/1995 | Kaneko et al. | |
| 5,450,075 A | 9/1995 | Waddington | |
| 5,453,761 A | 9/1995 | Tanaka | |
| 5,473,343 A | 12/1995 | Kimmich et al. | |
| 5,473,344 A | 12/1995 | Bacon et al. | |
| 5,479,192 A | 12/1995 | Carroll, Jr. et al. | |
| 5,495,566 A * | 2/1996 | Kwatinetz | 345/785 |
| 5,508,703 A | 4/1996 | Okamura et al. | |
| 5,543,588 A | 8/1996 | Bisset et al. | |
| 5,559,301 A | 9/1996 | Bryan, Jr. et al. | |
| 5,559,943 A | 9/1996 | Cyr et al. | |
| 5,561,445 A | 10/1996 | Miwa et al. | |
| 5,564,112 A | 10/1996 | Hayes et al. | |
| 5,565,887 A | 10/1996 | McCambridge et al. | |
| 5,578,817 A | 11/1996 | Bidiville et al. | |
| 5,581,670 A | 12/1996 | Bier et al. | |
| 5,585,823 A | 12/1996 | Duchon et al. | |
| 5,589,893 A | 12/1996 | Gaughan et al. | |
| 5,596,347 A | 1/1997 | Robertson et al. | |
| 5,598,183 A | 1/1997 | Robertson et al. | |
| 5,611,040 A | 3/1997 | Brewer et al. | |
| 5,611,060 A | 3/1997 | Belfiore et al. | |
| 5,613,137 A | 3/1997 | Bertram et al. | |
| 5,617,114 A | 4/1997 | Bier et al. | |
| 5,627,531 A | 5/1997 | Posso et al. | |
| 5,632,679 A | 5/1997 | Tremmel | |
| 5,640,258 A | 6/1997 | Kurashima et al. | |
| D382,550 S | 8/1997 | Kaneko et al. | |
| 5,657,012 A | 8/1997 | Tait | |
| D385,542 S | 10/1997 | Kaneko et al. | |
| 5,689,285 A | 11/1997 | Asher | |
| 5,726,687 A | 3/1998 | Belfiore et al. | |
| 5,729,219 A | 3/1998 | Armstrong et al. | |
| 5,730,165 A | 3/1998 | Philipp | |
| 5,748,185 A | 5/1998 | Stephan et al. | |
| 5,751,274 A | 5/1998 | Davis | |
| 5,754,890 A | 5/1998 | Holmdahl et al. | |
| 5,777,605 A | 7/1998 | Yoshinobu et al. | |
| 5,786,818 A | 7/1998 | Brewer et al. | |
| 5,790,769 A | 8/1998 | Buxton et al. | |
| 5,805,144 A | 9/1998 | Scholder et al. | |
| 5,808,602 A | 9/1998 | Sellers | |
| 5,825,353 A | 10/1998 | Will | |
| 5,828,364 A | 10/1998 | Siddiqui | |
| 5,838,304 A | 11/1998 | Hall | |
| 5,841,423 A | 11/1998 | Carroll, Jr. et al. | |
| D402,281 S | 12/1998 | Ledbetter et al. | |
| 5,850,213 A | 12/1998 | Imai et al. | |
| 5,856,822 A | 1/1999 | Du et al. | |
| 5,859,629 A | 1/1999 | Tognazzini | |
| 5,875,311 A | 2/1999 | Bertram et al. | |
| 5,883,619 A | 3/1999 | Ho et al. | |
| 5,889,236 A | 3/1999 | Gillespie et al. | |
| 5,903,229 A | 5/1999 | Kishi | |
| 5,907,152 A | 5/1999 | Dandliker et al. | |
| 5,907,318 A | 5/1999 | Medina | |
| 5,909,211 A | 6/1999 | Combs et al. | |
| 5,914,706 A | 6/1999 | Kono | |
| 5,923,388 A | 7/1999 | Kurashima et al. | |
| 5,943,044 A | 8/1999 | Martinelli et al. | |
| 5,956,019 A | 9/1999 | Bang et al. | |
| 5,959,611 A | 9/1999 | Smailagic et al. | |
| 5,973,668 A | 10/1999 | Watanabe | |
| 6,000,000 A | 12/1999 | Hawkins et al. | |
| 6,002,389 A | 12/1999 | Kasser | |
| 6,005,299 A | 12/1999 | Hengst | |
| 6,025,832 A | 2/2000 | Sudo et al. | |
| 6,031,518 A | 2/2000 | Adams et al. | |
| 6,034,672 A | 3/2000 | Gaultier et al. | |
| 6,057,829 A | 5/2000 | Silfvast | |
| 6,075,533 A | 6/2000 | Chang | |
| 6,084,574 A | 7/2000 | Bidiville | |
| 6,097,372 A | 8/2000 | Suzuki | |
| 6,124,587 A | 9/2000 | Bidiville | |
| 6,128,006 A | 10/2000 | Rosenberg et al. | |
| 6,163,312 A | 12/2000 | Furuya | |
| 6,166,721 A | 12/2000 | Kuroiwa et al. | |
| 6,179,496 B1 | 1/2001 | Chou | |
| 6,181,322 B1 | 1/2001 | Nanavati | |
| 6,188,393 B1 | 2/2001 | Shu | |
| 6,191,774 B1 | 2/2001 | Schena et al. | |
| 6,198,473 B1 | 3/2001 | Armstrong | |
| 6,211,861 B1 | 4/2001 | Rosenberg et al. | |
| 6,219,038 B1 | 4/2001 | Cho | |
| D442,592 S | 5/2001 | Ledbetter et al. | |
| 6,225,976 B1 | 5/2001 | Yates et al. | |
| 6,225,980 B1 | 5/2001 | Weiss et al. | |
| 6,226,534 B1 * | 5/2001 | Aizawa | 455/566 |
| D443,616 S | 6/2001 | Fisher et al. | |
| 6,243,078 B1 | 6/2001 | Rosenberg | |
| 6,256,011 B1 | 7/2001 | Culver | |
| 6,262,717 B1 | 7/2001 | Donohue et al. | |
| 6,266,050 B1 | 7/2001 | Oh et al. | |
| 6,297,795 B1 * | 10/2001 | Kato et al. | 345/684 |
| 6,323,845 B1 | 11/2001 | Robbins | |
| 6,340,800 B1 | 1/2002 | Zhai et al. | |
| D454,568 S | 3/2002 | Andre et al. | |
| 6,373,470 B1 | 4/2002 | Andre et al. | |

| | | | | | | |
|---|---|---|---|---|---|---|
| 6,377,530 | B1 | 4/2002 | Burrows | JP | 5-211021 | 8/1993 |
| 6,429,852 | B1 | 8/2002 | Adams et al. | JP | 5-217464 | 8/1993 |
| 6,473,069 | B1 | 10/2002 | Gerpheide | JP | 05-262276 | 10/1993 |
| 6,492,979 | B1 | 12/2002 | Kent et al. | JP | 5-265656 | 10/1993 |
| 6,496,181 | B1 | 12/2002 | Bomer | JP | 5-274956 | 10/1993 |
| 6,497,412 | B1 * | 12/2002 | Bramm ............ 273/430 | JP | 05-289811 | 11/1993 |
| 6,587,091 | B2 | 7/2003 | Serpa | JP | 5-298955 | 11/1993 |
| 6,636,197 | B1 | 10/2003 | Goldenberg et al. | JP | 5-325723 | 12/1993 |
| 6,639,584 | B1 * | 10/2003 | Li ................. 345/173 | JP | 06-20570 | 1/1994 |
| 6,650,975 | B2 | 11/2003 | Ruffner | JP | 06-208433 | 2/1994 |
| 6,677,927 | B1 | 1/2004 | Bruck et al. | JP | 6-084428 | 3/1994 |
| 6,686,904 | B1 * | 2/2004 | Sherman et al. ........ 345/168 | JP | 6-089636 | 3/1994 |
| 6,703,550 | B2 | 3/2004 | Chu | JP | 6-96639 | 4/1994 |
| 6,724,817 | B1 * | 4/2004 | Simpson et al. ...... 375/240.07 | JP | 06-096639 | 4/1994 |
| 6,727,889 | B2 | 4/2004 | Shaw | JP | 06-111685 | 4/1994 |
| 6,738,045 | B2 * | 5/2004 | Hinckley et al. ........ 345/163 | JP | 6-111695 | 4/1994 |
| 6,750,803 | B2 | 6/2004 | Yates et al. | JP | 06-111695 | 4/1994 |
| 6,791,533 | B2 | 9/2004 | Su | JP | 6-139879 | 5/1994 |
| 6,795,057 | B2 | 9/2004 | Gordon | JP | 06-187078 | 7/1994 |
| 6,844,872 | B1 | 1/2005 | Farag et al. | JP | 6-267382 | 9/1994 |
| 6,978,127 | B1 | 12/2005 | Bulthuis et al. | JP | 06-283993 | 10/1994 |
| 2001/0011991 | A1 | 8/2001 | Wang et al. | JP | 6-333459 | 12/1994 |
| 2001/0043545 | A1 | 11/2001 | Aratani | JP | 7-107574 | 4/1995 |
| 2001/0050673 | A1 | 12/2001 | Davenport | JP | 07-107574 | 4/1995 |
| 2001/0051046 | A1 | 12/2001 | Watanabe et al. | JP | 07-107574 A | 4/1995 |
| 2002/0030665 | A1 | 3/2002 | Ano | JP | 07-41882 | 7/1995 |
| 2002/0033848 | A1 * | 3/2002 | Sciammarella et al. ..... 345/838 | JP | 7-41882 | 7/1995 |
| 2002/0045960 | A1 * | 4/2002 | Phillips et al. ............ 700/94 | JP | 7-201249 | 8/1995 |
| 2002/0089545 | A1 * | 7/2002 | Levi Montalcini ......... 345/784 | JP | 07-201256 | 8/1995 |
| 2002/0118169 | A1 | 8/2002 | Hinckley et al. | JP | 07-253838 | 10/1995 |
| 2002/0154090 | A1 | 10/2002 | Lin | JP | 07-261899 | 10/1995 |
| 2002/0158844 | A1 | 10/2002 | McLoone et al. | JP | 7-261899 | 10/1995 |
| 2002/0164156 | A1 | 11/2002 | Bilbrey | JP | 7-261922 | 10/1995 |
| 2002/0180701 | A1 | 12/2002 | Hayama et al. | JP | 07-296670 | 11/1995 |
| 2003/0043121 | A1 | 3/2003 | Chen | JP | 07/319001 | 12/1995 |
| 2003/0050092 | A1 * | 3/2003 | Yun ............ 455/556 | JP | 08-016292 | 1/1996 |
| 2003/0076303 | A1 | 4/2003 | Huppi | JP | 8-115158 | 5/1996 |
| 2003/0076306 | A1 | 4/2003 | Zadesky et al. | JP | 08-115158 | 5/1996 |
| 2003/0095096 | A1 | 5/2003 | Robbin et al. | JP | 8-203387 | 8/1996 |
| 2003/0098851 | A1 | 5/2003 | Brink | JP | 8-293226 | 11/1996 |
| 2003/0184517 | A1 | 10/2003 | Senzui et al. | JP | 8-298045 | 11/1996 |
| 2004/0239622 | A1 | 12/2004 | Proctor et al. | JP | 08-299541 | 11/1996 |
| 2004/0252109 | A1 | 12/2004 | Trent, Jr. et al. | JP | 8-316664 | 11/1996 |
| | | | | JP | 09-128148 | 5/1997 |
| | | FOREIGN PATENT DOCUMENTS | | JP | 9-218747 | 8/1997 |
| | | | | JP | 9-230993 | 9/1997 |
| DE | | 19722636 | 12/1998 | JP | 09-230993 | 9/1997 |
| DE | | 10022537 | 11/2000 | JP | 9-231858 | 9/1997 |
| EP | | 0 498 540 A2 | 1/1992 | JP | 09-233161 | 9/1997 |
| EP | | 0674288 A1 | 9/1995 | JP | 9-251347 | 9/1997 |
| EP | | 0 731 407 A1 | 9/1996 | JP | 9-258895 | 10/1997 |
| EP | | 0 551 778 B1 | 1/1997 | JP | 9-288926 | 11/1997 |
| EP | | 0551778 B1 | 1/1997 | JP | 10-074429 | 3/1998 |
| EP | | 0 880 091 A2 | 11/1998 | JP | 10-198507 | 7/1998 |
| EP | | 1 026 713 A1 | 8/2000 | JP | 10-227878 | 8/1998 |
| EP | | 1 162 826 | 12/2001 | JP | 10-326149 | 12/1998 |
| FR | | 2 686 440 A1 | 7/1993 | JP | 11-184607 | 7/1999 |
| JP | | 57-95722 | 6/1982 | JP | 11-194863 | 7/1999 |
| JP | | 57 97626 | 6/1982 | JP | 11-194872 | 7/1999 |
| JP | | 05-36623 | 5/1983 | JP | 11-194882 | 7/1999 |
| JP | | 05-233141 | 9/1983 | JP | 11-194883 | 7/1999 |
| JP | | 61-117619 | 6/1986 | JP | 11-194891 | 7/1999 |
| JP | | 61-124009 | 6/1986 | JP | 11-195353 | 7/1999 |
| JP | | 63-20411 | 1/1988 | JP | 11-203045 | 7/1999 |
| JP | | 63-106826 | 5/1988 | JP | 11-272378 | 10/1999 |
| JP | | 63-181022 | 7/1988 | JP | 2000-215549 | 8/2000 |
| JP | | 63-298518 | 12/1988 | JP | 2000-267786 | 9/2000 |
| JP | | 04-32920 | 2/1992 | JP | 2000-353045 | 12/2000 |
| JP | | 5-041135 | 2/1993 | JP | 2001-11769 | 1/2001 |
| JP | | 5-101741 | 4/1993 | JP | 2001-22508 | 1/2001 |
| JP | | 05080938 A | 4/1993 | JP | 03-57617 | 6/2001 |
| JP | | 5-189110 | 7/1993 | JP | 2002-215311 | 8/2002 |
| JP | | 5-205565 | 8/1993 | JP | 2003280807 | 10/2003 |

| | | |
|---|---|---|
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 9/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-8579 | 2/2000 |
| TW | 431607 | 4/2001 |
| WO | WO94/17494 | 8/1994 |
| WO | WO98/14863 | 4/1998 |
| WO | WO99/49443 | 9/1999 |

OTHER PUBLICATIONS

"Neuros MP3 Digital Audio Computer", www.neurosaudio.com., downloaded Apr. 9, 2003.
"OEM Touchpad Modules" website www.glidepoint.com/sales/modules.index.shtml, downloaded Feb. 13, 2002.
"Product Overview—ErgoCommander®", www.logicad3d.com/products/ErgoCommander.htm, downloaded Apr. 8, 2002.
"Product Overview—SpaceMouse® Classic", www.logicad3d.com/products/Classic.htm, downloaded Apr. 8, 2002.
"Synaptics Tough Pad Interfacing Guide" Second Edition, Mar. 25, 1998, Synaptics, Inc. San Jose, CA, pp. 1 to 90.
Chapweske, Adam, "PS/2 Mouse/Keyboard Protocol", 1999, http://panda.cs.ndsu.nodak.edu/~achapwes/PICmicro/PS2/ps2.htm.
Fiore, Andrew, "Zen Touchpad", Cornell University, May 2000.
Gadgetboy, "Point and click with the latest mice", CNETAsia Product Review, www.asia.cnet.com/reviews...are/gadgetboy/0,39001770,38023590,00.htm, downloaded Dec. 5, 2001.
Tessler et al. "Touchpads Three new input devices", website www.macworld.com/1996/02/review/1806.html, downloaded Feb. 13, 2002.
"Der Klangmeister," Connect Magazine, Aug. 1998.
Photographs of Innovations 2000 Best of Show award presented at the 2000 International CES Innovations 2000 Design & Engineering Showcase, 1 pg.
BeoCom 6000, Sales Training Brochure, date unknown.
Letter re: Bang & Olufsen A/S, by David Safran, Nixon Peabody, LLP, May 21, 2004.
Marriott et al., U.S. Appl. No. 10/722,948, filed Nov. 25, 2003.
U.S. Appl. No. 10/060,712 filed Jan. 29, 2002.
U.S. Appl. No. 10/209,537 filed Jul. 30, 2002.
"Apple Unveils Optical Mouse and New Pro Keyboard," Press Release, Jul. 19, 2000.
"System Service and Troubleshooting Manual," www.dsplib.com/intv/Master, downloaded Dec. 11, 2002.
Kevin DeMeyer, "Crystal Optical Mouse," Feb. 14, 2002, Heatseekerz, Web-Article 19.
Communication pursuant to Article 96(2) EPC for corresponding EP Application No. 02 776 261.6 dated Apr. 13, 2006.
Notification of Reasons for Rejection for corresponding Japanese Application No. 2003-538879 dated Sep. 12, 2006, with translation.
Notification of Provision Rejection for corresponding Korean Application No. 10-2004-7005119 dated Aug. 29, 2006, with translation.
David H. Ahl, "Controller Update", Creative Computing vol. 9, No. 12, Dec. 1983.
"Atari VCS/2600 Peripherals", www.classicgaming.com/gamingmuseum/2600p.html, downloaded Feb. 28, 2007, pp. 1-15.
Notification of Final Rejection for corresponding Korean Application No. 10-2004-7005119 dated Aug. 31, 2007 with translation.
"Apple Presents iPod Ultra-Portable MP3 Music Player Puts 1,000 Songs in Your Pocket", Press Release, Oct. 23, 2001, 3 pgs.
Communication pursuant to Article 96(2) EPC for corresponding EP Application No. 02 776 261.6 dated Jun. 28, 2007.
U.S. Appl. No. 11/610,181, entitled "Method and Apparatus for Accelerated Scrolling", filed Dec. 13, 2006.
U.S. Appl. No. 11/610,190, entitled "Method and Apparatus for Accelerated Scrolling", filed Dec. 13, 2006.
U.S. Appl. No. 10/259,159, entitled "Method and Apparatus for Use of Rotational User Inputs", filed Sep. 26, 2002.
U.S. Appl. No. 11/610,376, entitled "Method and Apparatus for Use of Rotational User Inputs", filed Dec. 13, 2006.
U.S. Appl. No. 11/610,384, entitled "Method and Apparatus for Use of Rotational User Inputs", filed Dec. 13, 2006.
"Alps Electric introduces the GlidePoint Wave Keyboard; combines a gently curved design with Alps' advanced GlidePoint Technology", Business Wire (Oct. 21, 1996).
Alps Electric Ships GlidePoint Keyboard for the Macintosh; Includes a GlidePoint Touchpad, Erase-Eaze Backspace Key and Countoured Wrist Rest, Business Wire, (Jul. 1, 1996).
"APS show guide to exhibitors", Physics Today, 49(3) (Mar. 1996).
"Design News literature plus", Design News, 51(24) (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
Bartimo, Jim, "The Portables: Traveling Quickly", Computerworld (Nov. 14, 1983).
Brink et al., "Pumped-up portables", U.S. News & World Report, 116(21) (May 30, 1994).
Brown et al., "Windows on Tablets as a Means of Achieving Virtual Input Devices", Human-Computer Interaction — INTERACT '90 (1990).
Buxton et al., "Issues and Techniques in Touch-Sensitive Tablet Input", Computer Graphics, 19(3), Proceedings of SIGGRAPH '85 (1985).
Chen et al., "A Study in Interactive 3-D Rotation Using 2-D Control Devices", Computer Graphics 22(4) (Aug. 1988).
Evans et al., "Tablet-based Valuators that Provide One, Two, or Three Degrees of Freedom", Computer Graphics 15(3) (Aug. 1981).
Jesitus, John , "Broken promises?", Industry Week/IW, 246(20) (Nov. 3, 1997).
Nass, Richard, "Touchpad input device goes digital to give portable systems a desktop "mouse-like" feel", Electronic Design, 44(18) (Sep. 3, 1996).
Perenson, Melissa, "New & Improved: Touchpad Redux", PC Magazine (Sep. 10, 1996).
Petruzzellis, "Force-Sensing Resistors" Electronics Now, 64(3) (Mar. 1993).
Sony presents "Choice Without Compromise" at IBC '97 M2 PRESSWIRE (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Tessler, Franklin, "Point Pad", Macworld 12(10) (Oct. 1995).
Tessler, Franklin, "Smart Input: How to Chose from the New Generation of Innovative Input Devices", Macworld 13(5) (May 1996).
Tessler, Franklin, "Touchpads", Macworld 13(2) (Feb. 1996).
Soderholm, Lars G., "Sensing Systems for 'Touch and Feel'", Design News (May 8, 1989), pp. 72-76.
Baig, E.C., "Your PC Just Might Need a Mouse", U.S. News & World Report 108(22) (Jun. 4, 1990).
Mims, Forrest M., III, "A Few Quick Pointers; Mouses, Touch Screens, Touch Pads, Light Pads, and The Like Can Make Your System Easier to Use", Computers & Electronics (22) (May 1984).
Petersen, Marty, "Koala Pad Touch Tablet & Micro Illustrator Software", InfoWorld (Oct. 10, 1983).
"Triax Custom Controllers due; Video Game Controllers", HFD-The Weekly Home Furnishing Newspaper, (67)(1) (Jan. 4, 1993).

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1997) "Dynamic Soundscape: Mapping Time to Space for Audio Browsing," Computer Human Interaction, pp. 194-201.

Kobayashi et al. "Development of the Touch Switches with the Click Response," Koukuu Denshi Gihou No. 17: pp. 44-48 (1994-3) (published by the Japan Aviation Electronics Industry, Ltd.); Translation of Summary.

* cited by examiner

METHOD AND APPARATUS FOR ACCELERATED SCROLLING

CROSS-REFERENCE TO RELATED APPLICATIONS

This application claims benefit of priority from U.S. Provisional Patent Application No. 60/346,237, filed Oct. 22, 2001, and entitled "METHOD AND SYSTEM FOR LIST SCROLLING," which is hereby incorporated by reference herein. Further, this application claims benefit of priority from U.S. Provisional Patent Application No. 60/387,692, filed Jun. 10, 2002, and entitled "METHOD AND APPARATUS FOR USE OF ROTATIONAL USER INPUTS," which is hereby incorporated by reference herein. Still further, this application claims benefit of priority from U.S. Provisional Patent Application No. 60/359,551, filed Feb. 25, 2002, and entitled "TOUCH PAD FOR HANDHELD DEVICE," which is hereby incorporated by reference herein.

This application is related to U.S. patent application Ser. No. 10/072,765, filed Feb. 7, 2002, and entitled "MOUSE HAVING A ROTARY DIAL," which is hereby incorporated by reference herein. This application is also related to U.S. patent application Ser. No. 10/188,182, filed Jul. 1, 2002, and entitled "TOUCH PAD FOR HANDHELD DEVICE," which is incorporated by reference herein.

BACKGROUND OF THE INVENTION

1. Field of the Invention

The present invention relates generally to a computing device and, more particularly, to a handheld computing device having a rotational input unit.

2. Description of the Related Art

There exist today many styles of input devices for performing operations with respect to a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into consideration when designing the consumer electronic device. In handheld computing devices, the input devices are typically buttons and switches. Buttons and switches are generally mechanical in nature and provide limited control with regard to the movement of a cursor (or other selector) and the making of selections. For example, they are generally dedicated to moving the cursor in a specific direction (e.g., arrow keys) or to making specific selections (e.g., enter, delete, number, etc.). In the case of handheld personal digital assistants (PDAs), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases, a dedicated portion of the touch pad may be tapped. In stationary devices such as desktop computers, the input devices are generally selected from keyboards, mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackball devices generally include one or more buttons for making selections on the display screen.

In addition to allowing input pointer movements and selections with respect to a Graphical User Interface (GUI) presented on a display screen, the input devices may also allow a user to scroll across the display screen in the horizontal or vertical directions. For example, a mouse may include a scroll wheel that allows a user to simply roll the scroll wheel forward or backward to perform a scrolling action. In addition, touch pads may provide dedicated active areas that implement scrolling when the user passes his or her finger linearly across the active area in the x and y directions. Both devices may also implement scrolling via horizontal and vertical scroll bars that are displayed as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

Further, consumer electronic products other than computers, such as cordless telephones, stereo receivers and compact-disc (CD) players, have used dials to enable users to select a phone number, a radio frequency and a specific CD, respectively. Here, typically, a limited-resolution display is used together with the dial. The display, at best, displays only a single item (number, frequency or label) in a low resolution manner using a character generator LCD. In other words, these devices have used single line, low resolution LCD readouts.

Thus, there is always a need for improved user input devices that facilitate greater ease of use of computing devices.

SUMMARY OF THE INVENTION

The present invention relates to improved approaches for users of computing devices to interact with graphical user interfaces. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed. Other aspects and features of the invention will become apparent below. Although the type of computing device can vary, the invention is particularly well-suited for use with a media player.

The invention can be implemented in numerous ways, including as a method, system, device, apparatus, graphical user interface, or computer readable medium. Several embodiments of the invention are discussed below.

As a method for scrolling through portions of a data set, one embodiment of the invention includes at least the acts of: receiving a number of units associated with a rotational user input; determining an acceleration factor pertaining to the rotational user input; modifying the number of units by the acceleration factor; determining a next portion of the data set based on the modified number of units; and presenting the next portion of the data set.

As a method for scrolling through portions of a data set associated with a handheld electronics device, one embodiment of the invention includes at least the acts of: receiving a rotational user input; determining an acceleration value pertaining to the rotational user input; and scrolling to a next portion of the data set based on at least the acceleration value. The acceleration value specifies a degree of acceleration associated with the rate at which the scrolling through the portions of the data set is to be achieved.

As a method for scrolling through portions of a data set associated with a handheld electronics device, another embodiment of the invention includes at least the acts of: receiving a rotational user input; determining whether or not to provide acceleration with respect to the rotational user input; and scrolling to a next portion of the data set in either an accelerated manner when the determining determines that acceleration is to be provided, or in an unaccelerated manner when the determining determines that acceleration is not to be provided.

As a method for scrolling through portions of a file, one embodiment of the invention includes at least the acts of: receiving a number of units from a rotational input device; determining a speed of rotation for the rotational input device; applying acceleration when the speed of rotation is greater than a speed threshold; removing any acceleration being applied when the speed of rotation is less then the speed threshold; modifying the number of units in accordance with the acceleration, if any; determining a next portion of the file based on the modified number of units; and presenting the next portion of the file.

As a portable media player, one embodiment of the invention includes at least: a storage disk drive that stores media content for each of a plurality of media items; a display screen that displays a portion of the media items at a time; a user input device that enables a user of the portable media player to at least scroll through the plurality of media items using a rotational action with respect to the user input device; and a processor that determines a rate of scrolling and thus determines a next portion of the media items to be displayed As a method for displaying a portion of a list of media items on a display of a media player, the media player having a rotational input device, one embodiment of the invention includes at least the acts of: determining a rate of turn of the rotational input device; obtaining a length of the list of media items; determining a next portion of the list of media items to be displayed based on the rate of the turn of the rotational input device and the length of the list of media items; and displaying the next portion of the list of media items.

As a method for displaying a portion of a list of items on a display of a computing device, the computing device having a rotational input device, one embodiment of the invention includes at least the acts of: determining an indication of turning of the rotational input device; determining a next portion of the list of items to be displayed based on the indication of turning of the rotational input device; and displaying the next portion of the list of items.

As a consumer electronics product, one embodiment of the invention includes at least: a storage disk that stores a plurality of media items; a display for displaying a first portion of the plurality of media items; and a user input device that enables a user of the consumer electronics product to at least scroll through a list of the plurality of media items in accordance with a user-controlled scroll rate; and a processor. The processor determines an acceleration factor for use in scrolling through the list of the plurality of media items and causes the consumer electronics product to display a second portion of the plurality of media items. The location of second portion of the plurality of media items within the list of the plurality of media items is dependent on at least the user-controlled scroll rate and the acceleration factor.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to improved approaches for users of computing devices to interact with graphical user interfaces. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed. Other aspects and features of the invention will become apparent below. Although the type of computing device can vary, the invention is particularly well-suited for use with a media player.

Embodiments of the invention are discussed below with reference to FIGS. 1–12. However, those skilled in the art will readily appreciate that the detailed description given herein with respect to these figures is for explanatory purposes as the invention extends beyond these limited embodiments.

Figure 1:
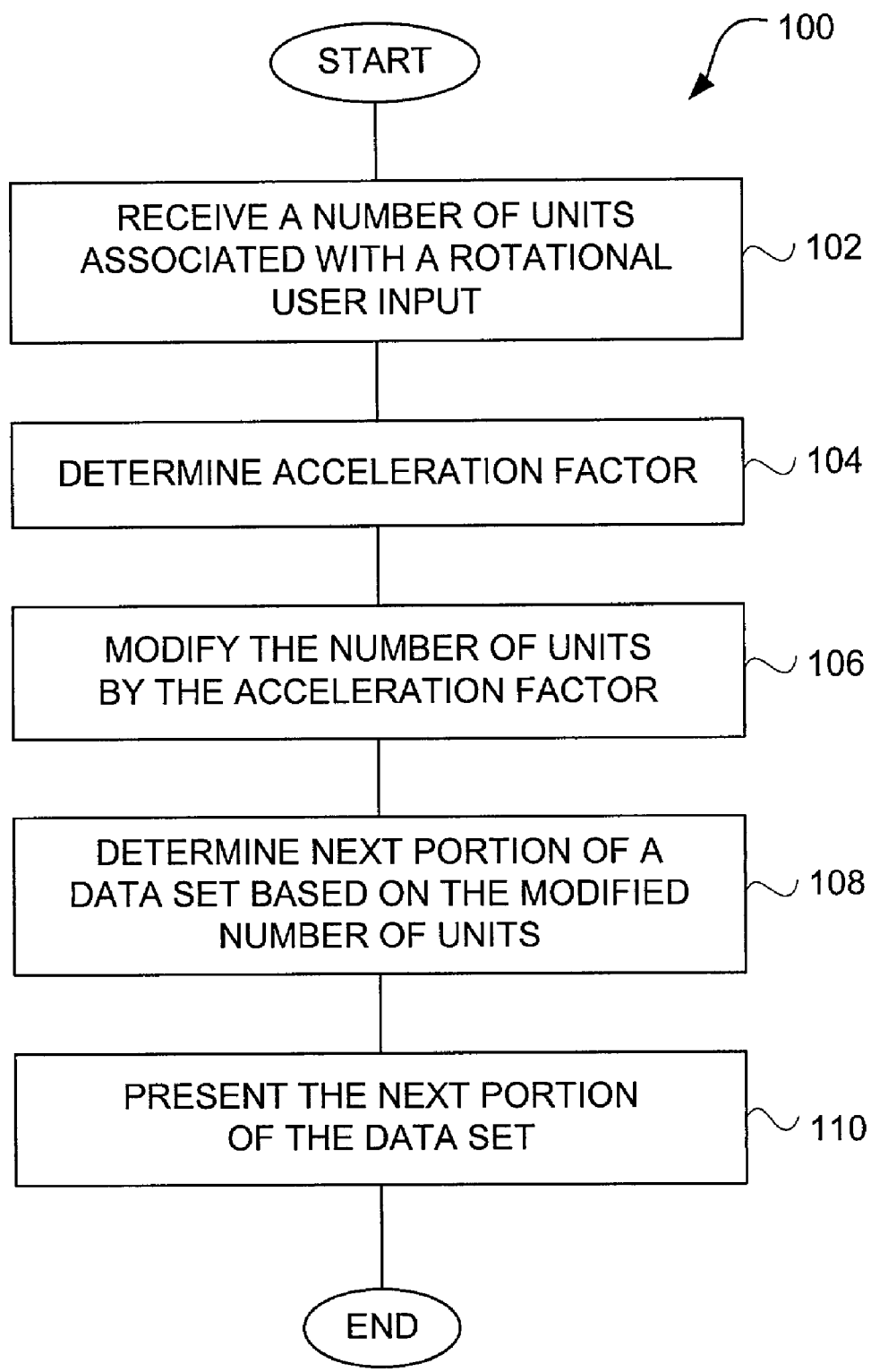
FIG. 1 is a flow diagram of scroll processing according to one embodiment of the invention.

FIG. 1 is a flow diagram of scroll processing 100 according to one embodiment of the invention. The scroll processing 100 assists a user in scrolling through a data set. The scroll processing 100 initially receives 102 a number of units associated with a rotational user input. The number of units is an indication of an amount of rotational movement a user has invoked with respect to a rotational input device.

Next, an acceleration factor is determined 104. The acceleration factor is an indication of the degree of acceleration to be utilized with the scroll processing 100. After the acceleration factor is determined 104, the number of units that are associated with the rotational user input is modified 106 by the acceleration factor. In one embodiment, the number of units is modified by multiplication with the acceleration factor. In various other embodiments, the number of units can be modified in various other ways.

After the number of units has been modified 106, a next portion of the data set that is being scrolled through can be determined 108 based on the modified number of units. Once the next portion has been determined 108, the next portion of the data set can be presented 110. Typically, the next portion of the data set associated with the scroll processing 100 is presented 110 to the user that caused the rotational user input. In one embodiment, the next portion of the data set can be presented 110 to the user by displaying the next portion of the data set on a display device. In another embodiment of the invention, the next portion of the data set can be presented 110 to the user by displaying the next portion of the data set with at least one item distinctively or distinguishly displayed (e.g., highlighted) from the other items. In still another embodiment, the next portion of the data set can be presented 110 to the user by playing or executing a file. After the next portion of the data set has been presented 110, the scroll processing 100 is complete and ends. However, the scroll processing 100 will repeat for each rotational user input.

Here, the faster the rate of rotational user input, the further down a list the next item becomes. It should be noted that the rate of rotational user input can be relative or absolute in nature. Still further, the rate of rotational user input need not be an actual velocity value, but could be a count or other value that is proportional to or influenced by the rate of rotational user input.

A data set as used herein pertains to a set of data. As one example, the data set can be a list of items (e.g., a list of songs). As another example, the data set can be a media file (e.g., MP3 or other audio file, video file, or image file). In one embodiment, the data set can be considered a sequential data set because the data within the set is often sequential. For example, the songs in a list are arranged sequentially and the data within an audio file are also arranged sequentially.

Figure 2:
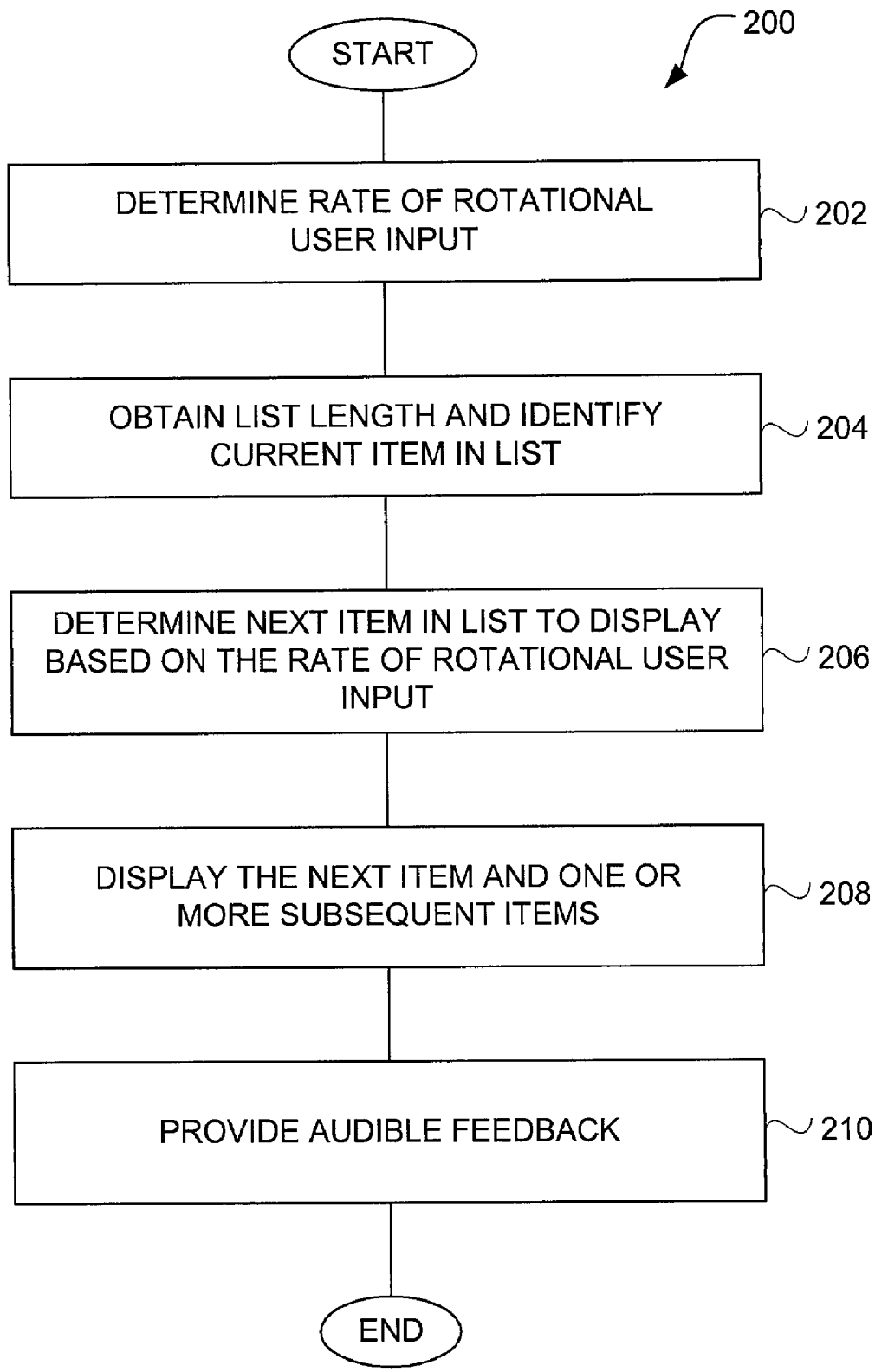
FIG. 2 is a flow diagram of list navigation processing according to another embodiment of the invention.

FIG. 2 is a flow diagram of list navigation processing 200 according to another embodiment of the invention. The list navigation processing 200 initially determines 202 a rate of rotational user input (e.g., dial turn). The rotational user input is provided through user interaction with a rotational input device. A list length is then obtained 204 and a current item in the list is identified. Typically, the current item is the item in the list that is being displayed. In one embodiment, the current item is highlighted such that it is distinctively displayed from other items of the list that are simultaneously displayed.

A next item in the list to be displayed is then determined 206 based on the rotational user input. The determination 206 of the next item in the list can also be dependent on the list length and the current item in the list. For example, the greater the rate of the rotational user input, the further apart the next item is from the current item in the list. The rate of the rotational user input and the length of the list can affect whether acceleration (e.g., acceleration factor) is provided for navigating the list. Thereafter, the list navigation processing 200 displays 208 a next item and one or more subsequent (or neighboring) items thereto. For example, the next item and the one or more subsequent items can be displayed 208 by a display screen produced by a display device. Additionally, the list navigation processing 200 can provide 210 an audio feedback. The audio feedback provides an audible sound that indicates feedback to the user as to the rate at which the items in the list are being traversed. The audible feedback can thus also be proportional to the rate of rotational user input.

Figure 3:
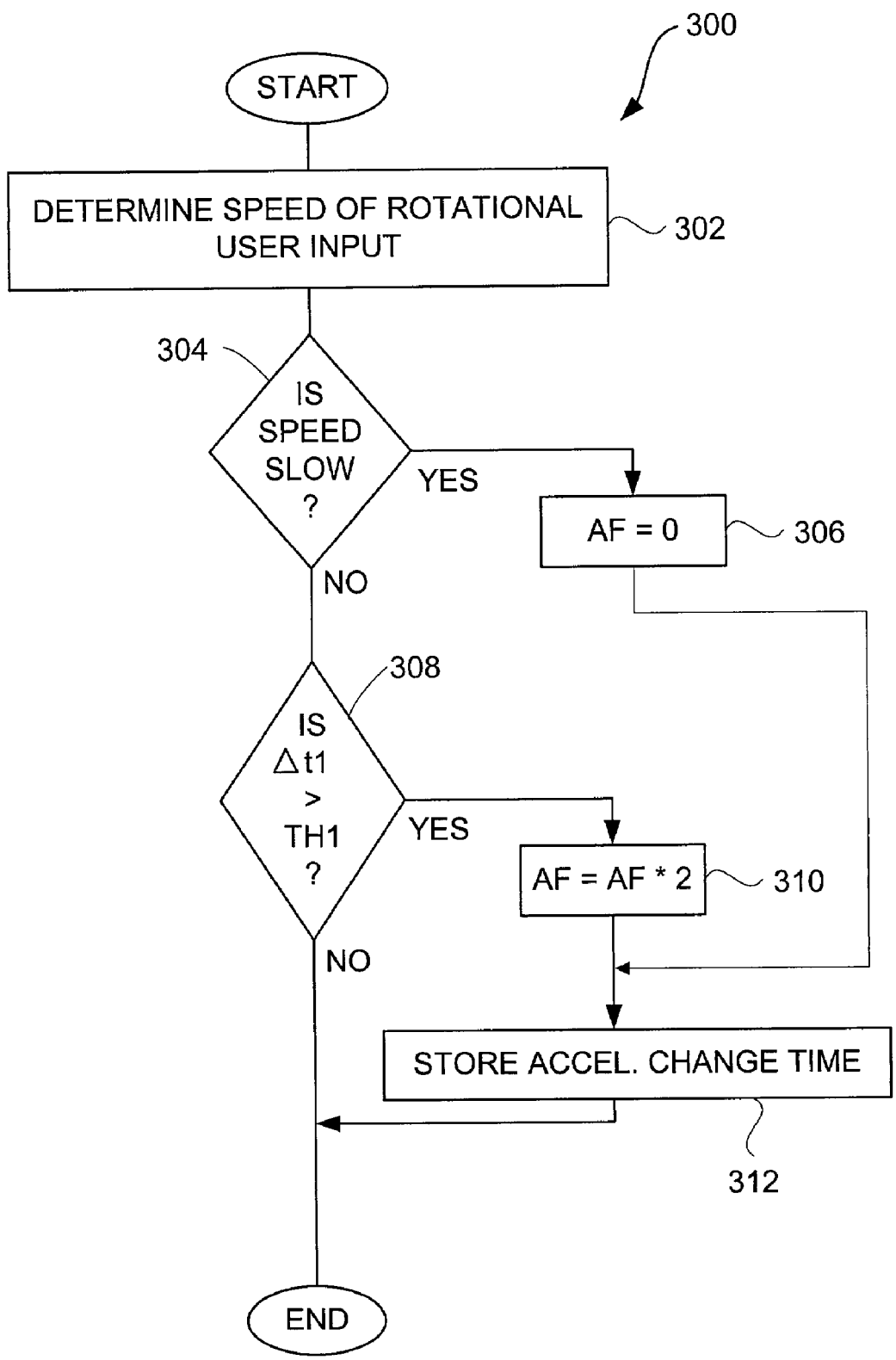
FIG. 3 is a flow diagram of acceleration amount processing according to one embodiment of the invention.

FIG. 3 is a flow diagram of acceleration amount processing 300 according to one embodiment of the invention. The acceleration amount processing 300 is, for example, processing that can be performed to determine an acceleration factor. In one embodiment, the acceleration amount processing 300 is, for example, suitable for use as the operation 104 illustrated in FIG. 1. In another embodiment, the acceleration amount processing 300 is, for example, suitable for use as a sub-operation for the operation 206 illustrated in FIG. 2.

The acceleration amount processing 300 initially determines 302 a speed of a rotational user input. As previously noted with respect to FIG. 1, the rotational user input is provided by a rotational input device that is interacted with by a user. In one embodiment, the speed of the rotational user input is determined 302 based on the number of rotational units identified by the rotational user input. More particularly, in another embodiment, the speed of the rotational user input is determined 302 based on the number of rotational units and an amount of time over which such rotational inputs were received. The speed of the rotational user input can, for example, be considered to be the speed of a user movement or the speed of rotation of a rotational input device.

After the speed of the rotational user input has been determined 302, a decision 304 determines whether the speed of the rotational user input is slow. The speed of the rotational user input can be determined or estimated, directly or indirectly, in a variety of ways. In one embodiment, a threshold is used to distinguish between slow and fast speeds of the rotational user input. The precise rate of rotation that is deemed to be the threshold between slow and fast can vary with application. The threshold can be determined experimentally based upon the particular application for which the acceleration amount processing 300 is utilized.

Once the decision 304 determines that the speed of the rotational user input is slow, then the acceleration factor (AF) is set 306 to zero (0). On the other hand, when the decision 304 determines that the speed of the rotational user input is not slow (i.e., the speed is fast), then a decision 308 determines whether an amount of time ($\Delta t1$) since the last time the acceleration was altered exceeds a first threshold (TH1). When the decision 308 determines that the amount of time (Δt1) since the last acceleration update is longer than the first threshold amount (TH1), then the acceleration factor is modified 310. In particular, in this embodiment, the modification 310 causes the acceleration factor to be doubled.

Following the operation 310, as well as following the operation 306, an acceleration change time is stored 312. The acceleration change time reflects the time that the acceleration factor was last updated. The acceleration change time is stored such that the decision 308 understands the amount of time since the acceleration was last modified (i.e., Δt1). Following the operation 312, as well as directly following the decision 308 when the amount of time since the last acceleration update was made is less than the first threshold (TH1), the acceleration amount processing 300 is complete and ends.

Hence, according to the acceleration amount processing 300, when the speed of the rotational user input is deemed slow, the acceleration factor is reset to zero (0), which indicates that no acceleration effect is imposed. On the other hand, when the speed of the rotational user input indicates that the speed of such rotation is fast, then the acceleration effect being imposed is doubled. In effect, then, if the user interacts with the rotational input device such that the speed of rotation is slow, then no acceleration effect is provided. In such case, the user can scroll through a data set (e.g., list, audio file) with high resolution. On the other hand, when the user interacts with the rotational input device with a high speed of rotation, then the acceleration effect is step-wise increased (e.g., via doubling or other means). The acceleration effect provided by the invention enables a user to interact with a rotational input device in an efficient, user-friendly manner such that long or extensive data sets can be scrolled through in a rapid manner.

Figure 4:
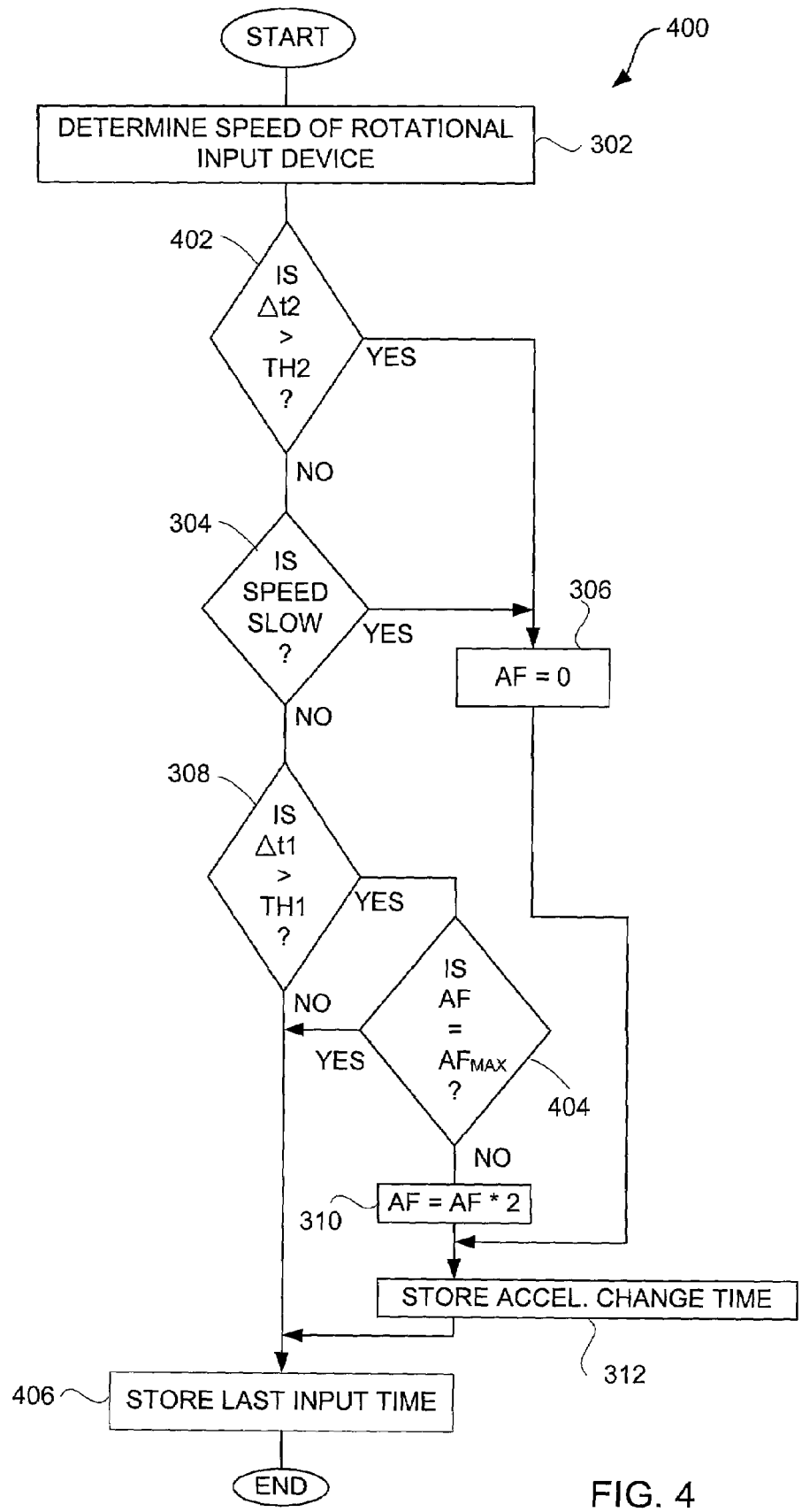
FIG. 4 is a flow diagram of acceleration amount processing according to another embodiment of the invention.

FIG. 4 is a flow diagram of acceleration amount processing 400 according to another embodiment of the invention. The acceleration amount processing 400 is generally similar to the acceleration amount processing 300 illustrated in FIG. 3. However, the acceleration amount processing 400 includes additional operations that can be optionally provided. More specifically, the acceleration amount processing 400 can utilize a decision 402 to determine whether a duration of time (Δt2) since the last rotational user input is greater than a second threshold (TH2). When the decision 402 determines that the duration of time (Δt2) since the last rotational user input exceeds the second threshold (TH2), then the acceleration factor is reset 306 to zero (0). Here, when the user has not provided a subsequent rotational user input for more than the duration of the second threshold (TH2), then the acceleration amount processing 400 is reset to no acceleration because it assumes that the user is restarting a scrolling operation and thus would not want to continue with a previous accelerated rate of scrolling.

The rate at which the acceleration effect is doubled is restricted such that the doubling (i.e., operation 310) can only occur at a rate below a maximum rate. The acceleration amount processing 400 also includes a decision 404 that determines whether the acceleration factor (AF) has reached a maximum acceleration factor (AF$_{MAX}$). The decision 404 can be utilized to limit the maximum acceleration that can be imposed by the acceleration amount processing 400. For example, the acceleration factor (AF) could be limited to a factor of eight (8), representing that with maximum acceleration scrolling would occur at a rate eight (8) times faster than non-accelerated scrolling.

Still further, the acceleration amount processing 400 stores 406 a last input time. The last input time (t2) represents the time the last rotational user input was received (or processed). Note that the duration of time (Δt2) can be determined by the difference between a current time associated with an incoming rotational user input and the last input time (t2).

As previously noted, the acceleration amount processing 300, 400 is, for example, processing that can be performed to determine an acceleration factor. However, although not depicted in FIG. 3 or 4, when the length of the data set (e.g., list) is short, then the acceleration can be set to zero (i.e., no acceleration) and the acceleration amount processing 300, 400 can be bypassed. For example, in one embodiment, where the data set is a list, if the display screen can display only five (5) entries at a time, then the list can be deemed short if it does not include more than twenty (20) items. Consequently, according to another embodiment of the invention, the acceleration effect imposed by the invention can be dependent on the length of the data set (e.g., list).

The accelerated scrolling can also be depicted as a state machine having states representing different acceleration levels or different rates of acceleration. The particulars of such a state machine will vary widely with implementation.

Figure 5:
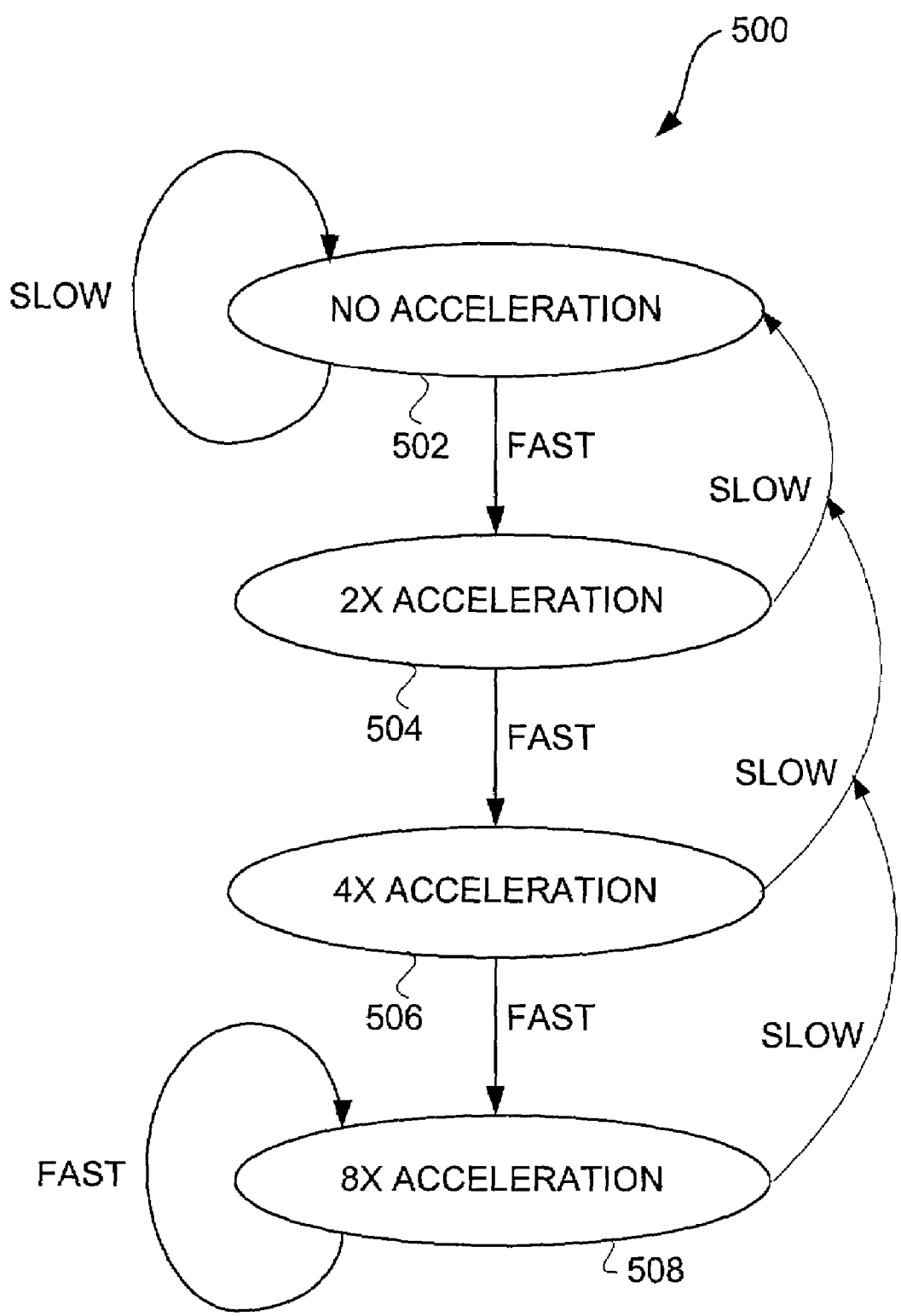
FIG. 5 is a representative acceleration state machine according to one embodiment of the invention.

FIG. 5 is a representative acceleration state machine 500 according to one embodiment of the invention. The acceleration state machine 500 has four states of acceleration. A first state 502 provides no acceleration. From the first state 502, when the speed of a next rotational user input is slow, the acceleration state machine 500 remains at the first state 502. Alternatively, when the speed of the rotational user input is fast, the acceleration state machine 500 transitions from a first state 502 to a second state 504. The second state 504 provides 2× acceleration, meaning that the resulting rate of scrolling would be twice that of the first state. When the acceleration state machine 500 is at the second state 504, when the speed of a next rotational user input is slow, the acceleration state machine 500 transitions back to the first state 502. Alternatively, when the speed of the next rotational user input is fast, the acceleration state machine 500 transitions from the second state 504 to a third state 506. The third state 506 provides 4× acceleration, meaning that the rate of scrolling would be four times that of the first state 502 or twice that of the second state 504. At the third state 506, when the speed of the next rotational user input is slow, the acceleration state machine 500 transitions from the third state 506 to the first state 502. Alternatively, when the speed of the next rotational user input is fast, the acceleration state machine 500 transitions from the third state 506 to a fourth state 508. At the fourth state 508, 8× acceleration is provided, meaning that the acceleration rate of scrolling is eight times that of the first state 502, four times that of the second state 504, or twice that of the third state 506. At the fourth state 508, when the speed of the next rotational user input is slow, the acceleration state machine 500 transitions from the fourth state 508 to the first state 502. Alternatively, when the speed of the next rotational user input is fast, the acceleration state machine 500 remains at the fourth state 508.

Figure 6:
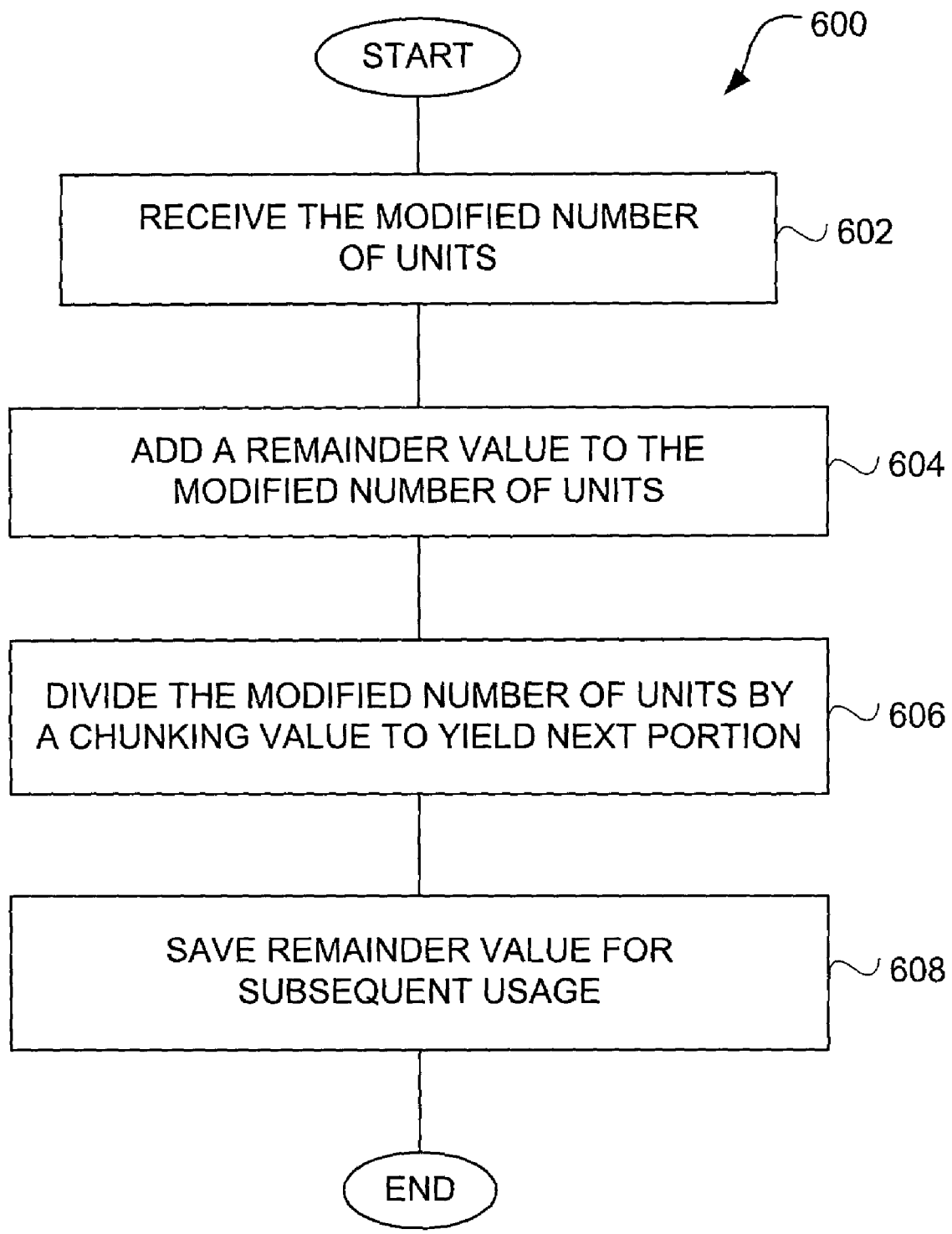
FIG. 6 is a flow diagram of next portion determination processing according to one embodiment of the invention.

FIG. 6 is a flow diagram of next portion determination processing 600 according to one embodiment of the invention. The next portion determination processing 600 is, for example, processing performed by the operation 108 illustrated in FIG. 1

The next portion determination processing 600 receives 602 the modified number of the units. For example, at operation 106 of FIG. 1, the number of units was modified 106 by the acceleration factor to determine the modified number of units. A remainder value is then added 604 to the modified number of units. The remainder value pertains to a previously determined remainder value as discussed below. Next, the modified number of units is divided 606 by a chunking value to view a next portion. The next portion is a subset of the data set that is eventually presented on a display device. For example, the next portion can pertain to one or more items in a list when the data set pertains to a list of items. In another example, the next portion can pertain to a segment or position in a audio file when the data set pertains to an audio file. In any case, the remainder value from the operation 606 is then saved 608 for subsequent usage in computing a subsequent next portion. Following the operation 608, the next portion determination processing 600 is complete and ends. Although the use of the remainder value is not necessary, the scrolling provided by the invention may be smoother to the user when the remainder is carried forward as described above.

As one example of the scroll processing according to the invention, consider the following exemplary case. Assume that the number of units associated with a rotational user input is 51 units. Also assume that an acceleration factor was determined to be 2. Hence, the modified number of units, according to one embodiment, would then be 102 units (51*2). In one implementation, a previous remainder value (if not stale) can be added to the modified number of units. Assume that the previous remainder value was 3, then the modified number of units becomes 105 (102+3). Thereafter, to determine the next portion of the data set, the modified number of units (105) is then divided by a chunking value (e.g., 5). Hence, the resulting value 20 indicates that the next portion of the data set is to be presented (i.e., displayed on a display device) would be 20 items down (up) in the list from the current item.

The scroll, list navigation or acceleration amount processing discussed above can be utilized with respect to an audio player having a screen that displays a list of songs, or that provides a scroll bar indicating position of playing within an audio file. Typically, such an audio player typically displays different screens on the display. Each such screen can be individually scrolled through using separate position and acceleration values. Alternatively, the acceleration values can be shared across multiple different screens. Each such screen could be associated with a different list that is partially displayed on the screen, a portion of which is displayed on the screen at a time and, through scrolling, the portion can be altered in an accelerated manner. The file can be a list or represent a scroll bar reflecting play position in a song. Additional details of screens suitable for use with an audio player are described in U.S. Provisional Patent Application No. 60/399,806, filed on Jul. 30, 2002, which is hereby incorporated herein by reference.

Figure 7A:
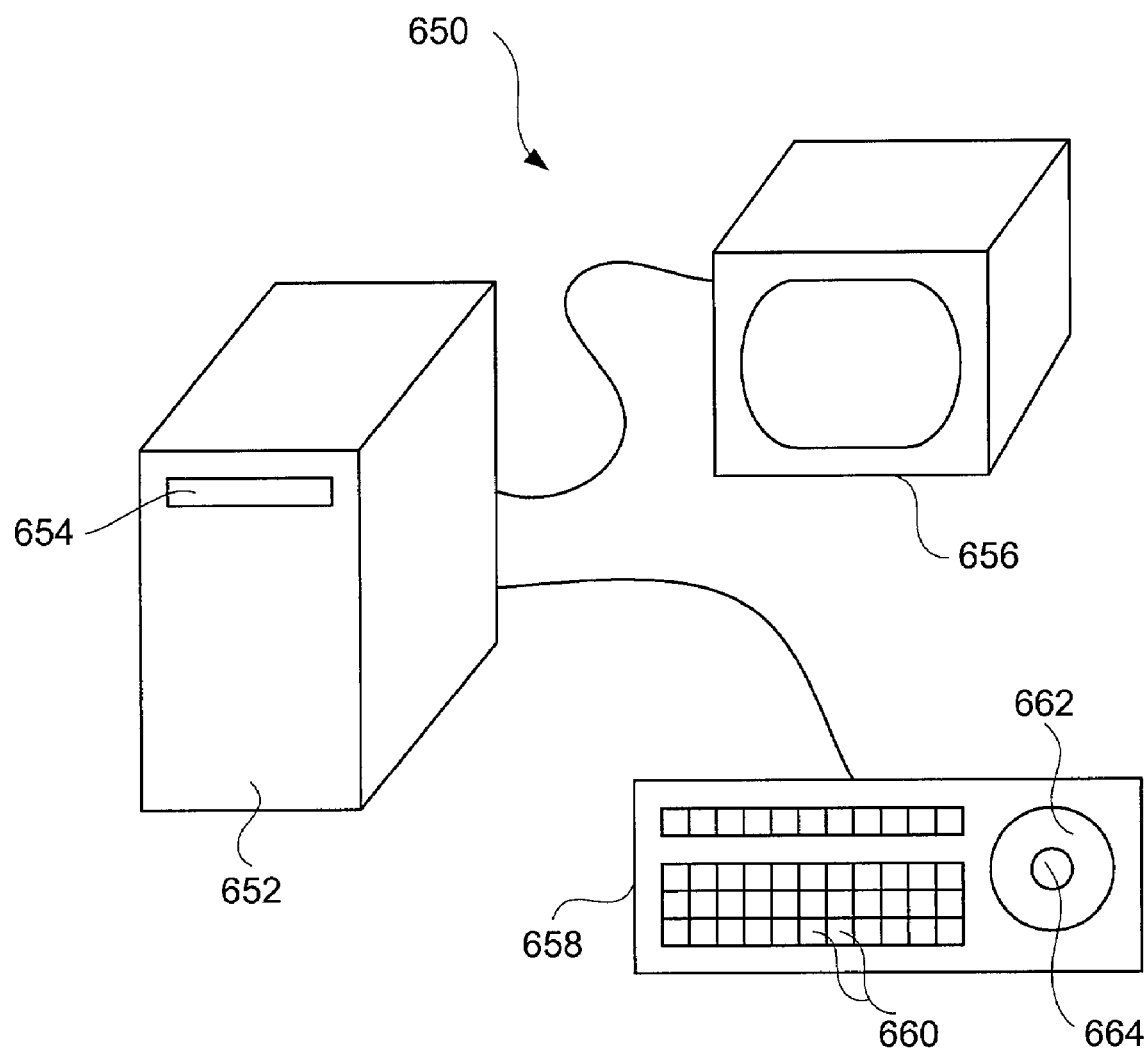
FIG. 7A is a perspective diagram of a computer system in accordance with one embodiment of the invention.

FIG. 7A is a perspective diagram of a computer system 650 in accordance with one embodiment of the invention. The computer system 650 includes a base housing 652 that encloses electronic circuitry that performs the computing operations for the computing system 650. Typically, the electronic circuitry includes a microprocessor, memory, I/O controller, graphics controller, etc. The housing 652 also provides a removable computer readable medium drive 654 in which a removable computer readable medium can be placed so as to electronically or optically read data therefrom. The computer housing 652 is also coupled to a display device 656 on which a screen display can be presented for a user of the computer system 650 to view. Still further, the computer system 650 includes a keyboard apparatus 658. The keyboard apparatus 658 allows a user to interact with a computer program (application program or operating system) performed by the computer system 650. In this regard, the keyboard apparatus 658 includes a plurality of keys 660 and a rotational input unit 662. The rotational input unit 662 allows a user to perform a rotational movement with respect to the rotational input unit 662. The rotational movement (rotational user input) can then be processed by the electronic circuitry of the computer system 650 and used to manipulate navigation or selection actions with respect to a graphical user interface being presented to the user on the display device 656. The keyboard apparatus 658 can also include a button 664 associated with the rotational input unit 662. As shown in FIG. 7A, the button 664 can be provided at a center region of the rotational input unit 662. However, the button 664 is not required and, if provided, can be placed elsewhere, such as outside the periphery of the rotational input unit 662.

Figure 7B:
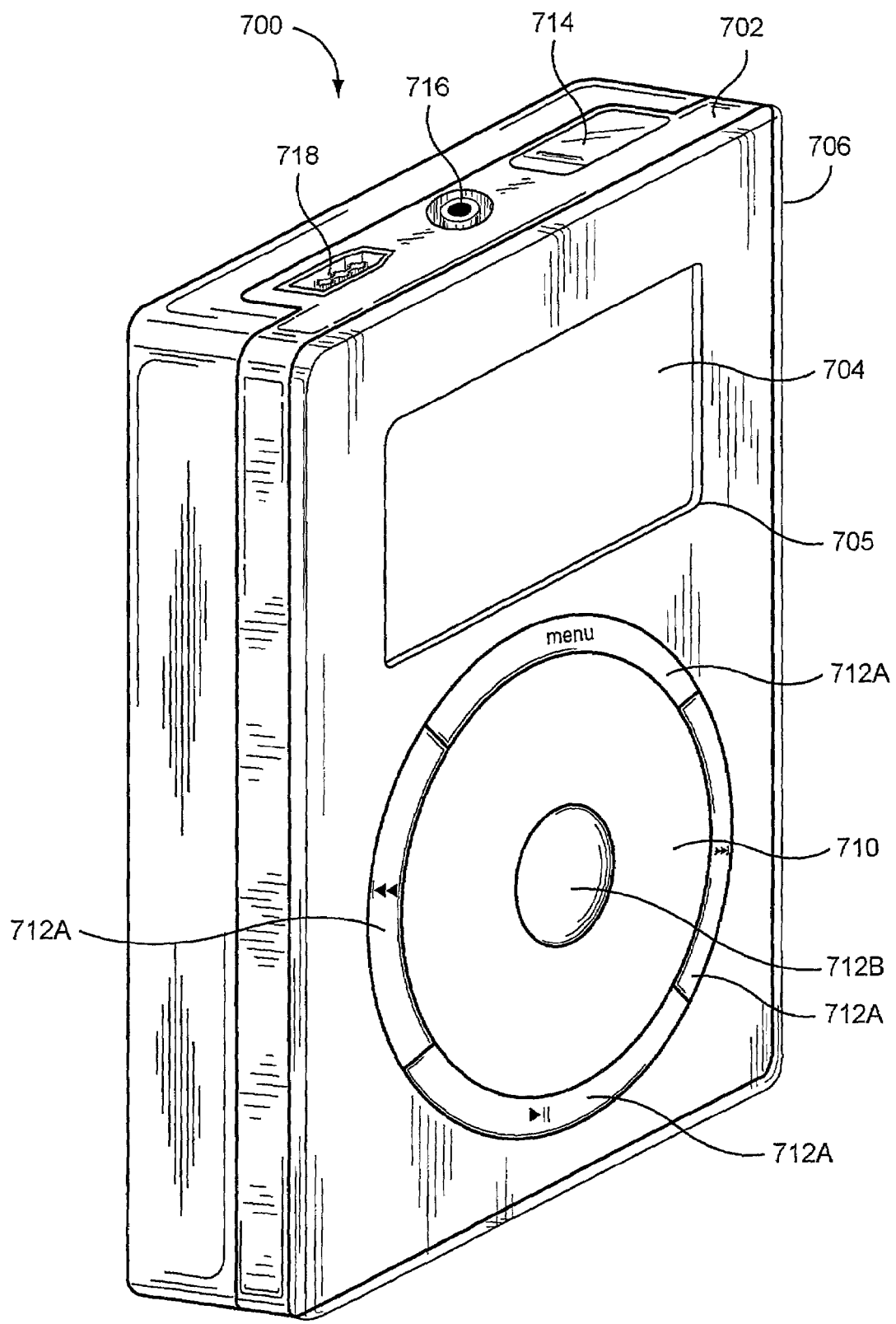
FIG. 7B is a perspective diagram of a media player in accordance with one embodiment of the present invention.

FIG. 7B is a perspective diagram of a media player 700 in accordance with one embodiment of the present invention. The term "media player" generally refers to computing devices that are dedicated to processing media such as audio, video or other images. In one implementation, the media player is a portable computing device. Examples of media players include music players, game players, video players, video recorders, cameras and the like. These computing devices are generally portable so as to allow a user to listen to music, play games or video, record video or take pictures wherever the user travels. In one embodiment, the media player is a handheld device that is sized for placement into a pocket of the user (i.e., pocket-sized). By being pocket-sized, the user does not have to directly carry the device and therefore the device can be taken almost anywhere the user travels (e.g., the user is not limited by carrying a large, bulky and often heavy device, as in a portable computer). For example, in the case of a music player (e.g., MP3 player), a user may use the device while working out at the gym. In the case of a camera, a user may use the device while mountain climbing. Furthermore, the device may be operated by the user's hands, no reference surface such as a desktop is needed. In one implementation, the music player can be pocket-sized and rather lightweight (e.g., dimensions of 2.43 by 4.02 by 0.78 inches and a weight of 6.5 ounces) for true portability.

The media player 700 typically has connection capabilities that allow a user to upload and download data to and from a host device such as a general purpose computer (e.g., desktop computer or portable computer). For example, in the case of a camera, photo images may be downloaded to the general purpose computer for further processing (e.g., printing). With regard to music players, songs and playlists stored on the general purpose computer may be downloaded into the music player. In one embodiment, the media player 700 can be a pocket-sized handheld MP3 music player that allows a user to store a large collection of music.

As shown in FIG. 7B, the media player 700 includes a housing 702 that encloses various electrical components (including integrated circuit chips and other circuitry) to provide computing capabilities for the media player 700. The integrated circuit chips and other circuitry may include a microprocessor, memory (e.g., ROM or RAM), a power source (e.g., a battery), a circuit board, a hard drive, and various input/output (I/O) support circuitry. In the case of music players, the electrical components may include components for outputting music such as an amplifier and a digital signal processor (DSP). In the case of video recorders or cameras, the electrical components may include components for capturing images such as image sensors (e.g., charge-coupled device (CCD) or complimentary oxide semiconductor (CMOS)) or optics (e.g., lenses, splitters, filters). The housing may also define the shape or form of the media player. That is, the contour of the housing 702 may embody the outward physical appearance of the media player 700.

The media player 700 also includes a display screen 704. The display screen 704 is used to display a Graphical User Interface (GUI) as well as other information to the user (e.g., text, objects, graphics). By way of example, the display screen 704 may be a liquid crystal display (LCD). In one particular embodiment, the display screen corresponds to a high-resolution display with a white LED backlight to give clear visibility in daylight as well as in low-light conditions. Additionally, according to one embodiment, the display screen 704 can be about 2 inches (measured diagonally) and provide a 160-by-128 pixel resolution. The display screen 704 can also operate to simultaneously display characters of multiple languages. As shown in FIG. 7B, the display screen 704 is visible to a user of the media player 700 through an opening 705 in the housing 702, and through a transparent wall 706 that is disposed over the opening 705. Although transparent, the transparent wall 706 may be considered part of the housing 702 since it helps to define the shape or form of the media player 700.

The media player 700 includes a rotational input device 710. The rotational input device 710 receives a rotational input action from a user of the media player 700. The rotational input action is used to control one or more control functions for controlling or interacting with the media player 700 (or application operating thereon). In one embodiment, the control function corresponds to a scrolling feature. The direction of scrolling can vary depending on implementation. For example, scrolling may be implemented vertically (up or down) or horizontally (left or right). For example, in the case of a music player, the moving finger may initiate a control function for scrolling through a song menu displayed on the display screen 704. The term "scrolling" as used herein generally pertains to moving displayed data (e.g., text or graphics) across a viewing area on a display screen 704 so that at least one new item of data (e.g., line of text or graphics) is brought into view in the viewing area. In essence, the scrolling function allows a user to view sets of data currently outside of the viewing area. The viewing area may be the entire viewing area of the display screen 704 or it may be only a portion of the display screen 704 (e.g., a window frame).

By way of example, in the case of a music player (e.g., MP3 player), the scrolling feature may be used to help browse through songs stored in the music player. To elaborate, the display screen 704, during operation, may display a list of media items (e.g., songs). A user of the media player 700 is able to linearly scroll through the list of media items by providing a rotational input action using the rotational input device 710. The displayed items from the list of media items are varied commensurate with the rotational input action such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by providing the rotational input action at greater speeds. The direction of the rotational input action may be arranged to control the direction of scrolling.

In addition to above, the media player 700 may also include one or more buttons 712. The buttons 712 are configured to provide one or more dedicated control functions for making selections or issuing commands associated with operating the media player 700. By way of example, in the case of a music player, the button functions may be associated with opening a menu, playing a song, fast forwarding a song, seeking through a menu and the like. In most cases, the button functions are implemented via a mechanical clicking action. The position of the buttons 712 relative to the rotational input device 710 may be widely varied. For example, they may be adjacent to one another or spaced apart. In the illustrated embodiment, the buttons 712 are configured to surround the inner and outer perimeter of the rotational input device 710. In this manner, the buttons 712 may provide tangible surfaces that define the outer boundaries of the rotational input device 710. As shown, there are four buttons 712A that surround the outer perimeter and one button 712B disposed in the center or middle of the rotational input device 710. By way of example, the plurality of buttons 712 may consist of a menu button, play/stop button, forward seek button, reverse seek button, and the like.

Moreover, the media player 700 may also include a power switch 714, a headphone jack 716 and a data port 718. The power switch 714 is configured to turn the media device 700 on and off. The headphone jack 716 is capable of receiving a headphone connector associated with headphones configured for listening to sound being outputted by the media device 700. The data port 718 is capable of receiving a data connector/cable assembly configured for transmitting and receiving data to and from a host device, such as a general purpose computer. By way of example, the data port 718 may be used to upload or download songs to and from the media device 700. The data port 718 may be widely varied. For example, the data port may be a PS/2 port, a serial port, a parallel port, a USB port, a FireWire port, and the like. In some cases, the data port 718 may be a radio frequency (RF) link or optical infrared (IR) link to eliminate the need for a cable. Although not shown in FIG. 7B, the media player 700 may also include a power port that receives a power connector/cable assembly configured for delivering power to the media player 700. In some cases, the data port 718 may serve as both a data and a power port.

Figure 8A:
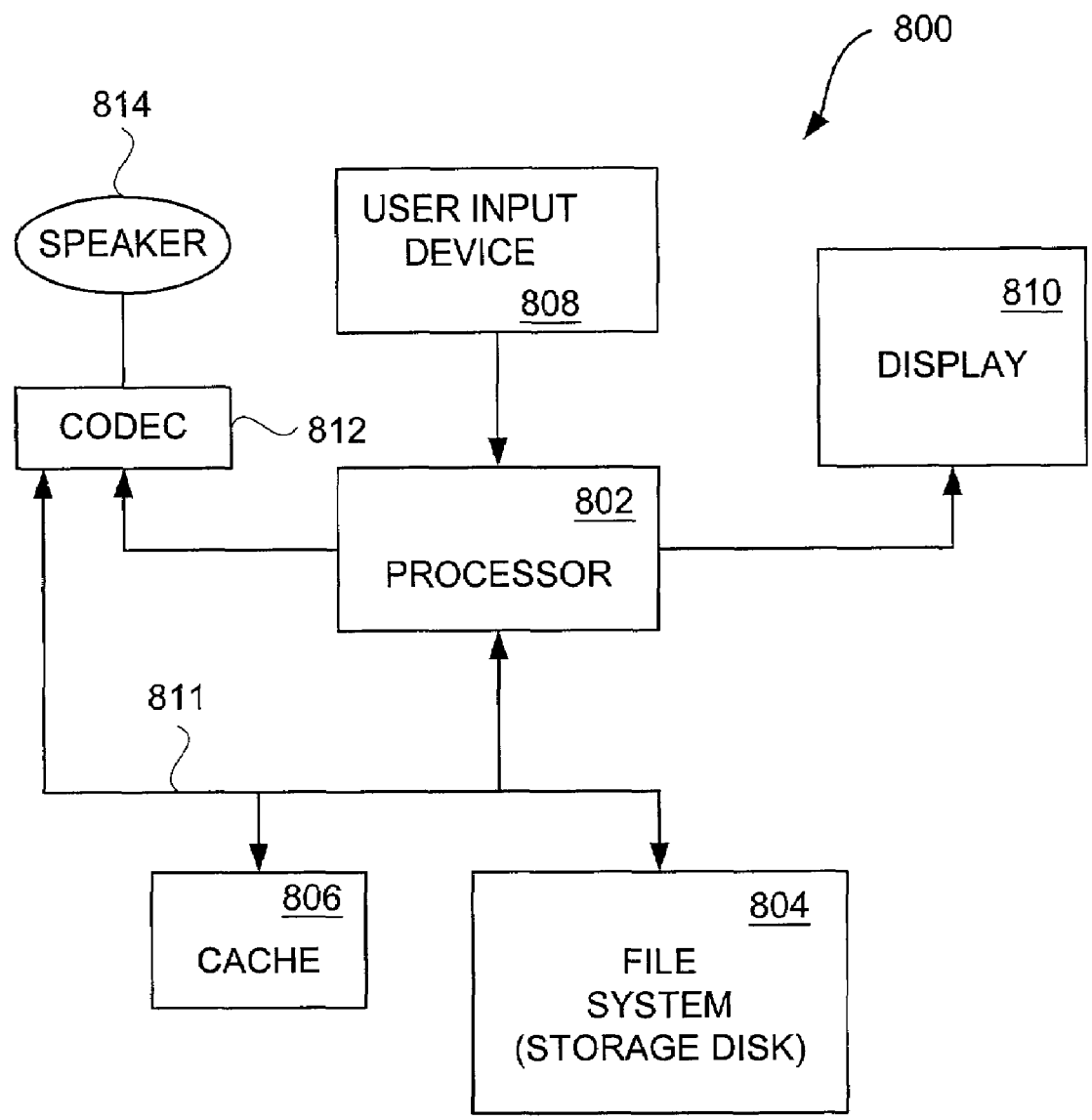
FIG. 8A is a block diagram of a media player according to one embodiment of the invention.

FIG. 8A is a block diagram of a media player 800 according to one embodiment of the invention. The media player 800 can, for example, represent internal components of the media player 700.

The media player 800 includes a processor 802 that pertains to a microprocessor or controller for controlling the overall operation of the media player 800. The media player 800 stores media data pertaining to media items in a file system 804 and a cache 806. The file system 804 is, typically, a storage disk or a plurality of disks. The file system typically provides high capacity storage capability for the media player 800. However, since the access time to the file system 804 is relatively slow, the media player 800 also includes a cache 806. The cache 806 is, for example, Random-Access Memory (RAM) provided by semiconductor memory. The relative access time to the cache 806 is substantially shorter than for the file system 804. However, the cache 806 does not have the large storage capacity of the file system 804. Further, the file system 804, when active, consumes more power than does the cache 806. The power consumption is particularly important when the media player 800 is a portable media player that is powered by a battery (not shown).

The media player 800 also includes a user input device 808 that allows a user of the media player 800 to interact with the media player 800. For example, the user input device 808 can take a variety of forms, such as a button, keypad, dial, etc. Still further, the media player 800 includes a display 810 (screen display) that can be controlled by the processor 802 to display information to the user. A data bus 811 can facilitate data transfer between at least the file system 804, the cache 806, the processor 802, and the coder/decoder (CODEC) 812. The media player 800 can also include an audio feedback unit (not shown) to provide audio feedback for user interactions (such as with the user input device 808).

In one embodiment, the media player 800 serves to store a plurality of media items (e.g., songs) in the file system 804. When a user desires to have the media player play a particular media item, a list of available media items is displayed on the display 810. Then, using the user input device 808, a user can select one of the available media items. The processor 802, upon receiving a selection of a particular media item, supplies the media data (e.g., audio file) for the particular media item to a coder/decoder (CODEC) 812. The CODEC 812 then produces analog output signals for a speaker 814. The speaker 814 can be a speaker internal to the media player 800 or external to the media player 800. For example, headphones or earphones that connect to the media player 800 would be considered an external speaker.

Figure 8B:
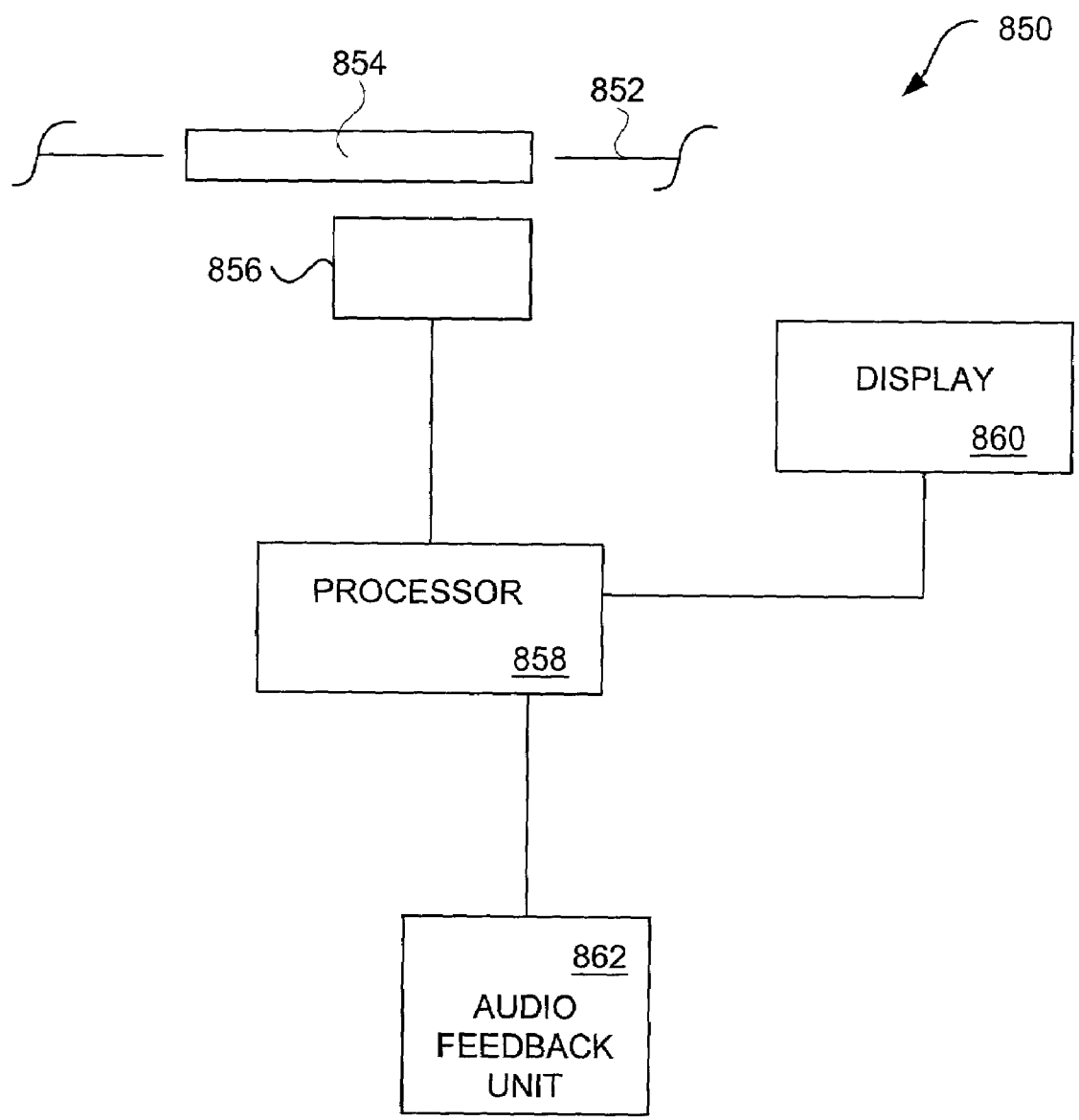
FIG. 8B is a block diagram of a computing system according to one embodiment of the invention.

FIG. 8B is a block diagram of a computing system 850 according to one embodiment of the invention. The computing system 850 can, for example, represent a portion of any of the computer system 650 shown in FIG. 7A, the media player 700 shown in FIG. 7B, or the media player 800 shown in FIG. 8A.

The computing system 850 includes a housing 852 that exposes a rotational input device 854. The housing 852 can be a computer's housing or an input/output device's housing. The rotational input device 854 permits a user to interact with the computing system 850 through a rotational action. The rotational action results from either rotation of the rotational input device 854 itself or by rotation of a stylus or user's finger about the rotational input device 854. As examples, the rotational input device 854 can be a rotary dial (including, e.g., a navigational wheel or a scroll wheel) capable of being rotated or a touch pad capable of rotational sensing. In one embodiment, the touch pad has a circular shape. A rotation pickup unit 856 couples to the rotational input device 854 to sense the rotational action. For example, the rotational pickup unit 856 can be optically or electrically coupled to the rotational input device 854.

The computing system 850 further includes a processor 858, a display 860 and an audio feedback unit 862. Signals pertaining to the rotational action are supplied to the processor 858. The processor 858 not only performs processing operations for application programs hosted by the computing system 850 but also can control the display 860 and the audio feedback unit 862. Alternatively, a specialized controller or other circuitry can support the processor 858 in controlling the display 860 or the audio feedback unit 862.

The processor 858 causes a display screen to be produced on the display 860. In one implementation, the display screen includes a selectable list of items (e.g., media items) from which a user may select one or more of the items. By the user providing a rotational action with respect to the rotational input device 854, the list can be scrolled through. The processor 858 receives the signals pertaining to the rotational action from the rotation pickup unit 856. The processor 858 then determines the next items of the list that are to be presented on a display screen by the display 860. In making this determination, the processor 858 can take into consideration the length of the list. Typically, the processor 858 will determine the rate of the rotational action such that the transitioning to different items in the media list can be performed at a rate proportional to the rate of the rotational action.

The processor 858 can also control the audio feedback unit 862 to provide audio feedback to a user. The audio feedback can, for example, be a clicking sound produced by the audio feedback unit 862. In one embodiment, the audio feedback unit 862 is a piezoelectric buzzer. As the rate of transitioning through the list of items increases, the frequency of the clicking sounds can increase. Alternatively, when the rate that the rotational input device 854 is turned slows, the rate of transitioning through the list of items decreases, and thus the frequency of the clicking sounds correspondingly slows. Hence, the clicking sounds provide audio feedback to the user as to the rate in which the items within the list of items are being traversed.

Figure 9:
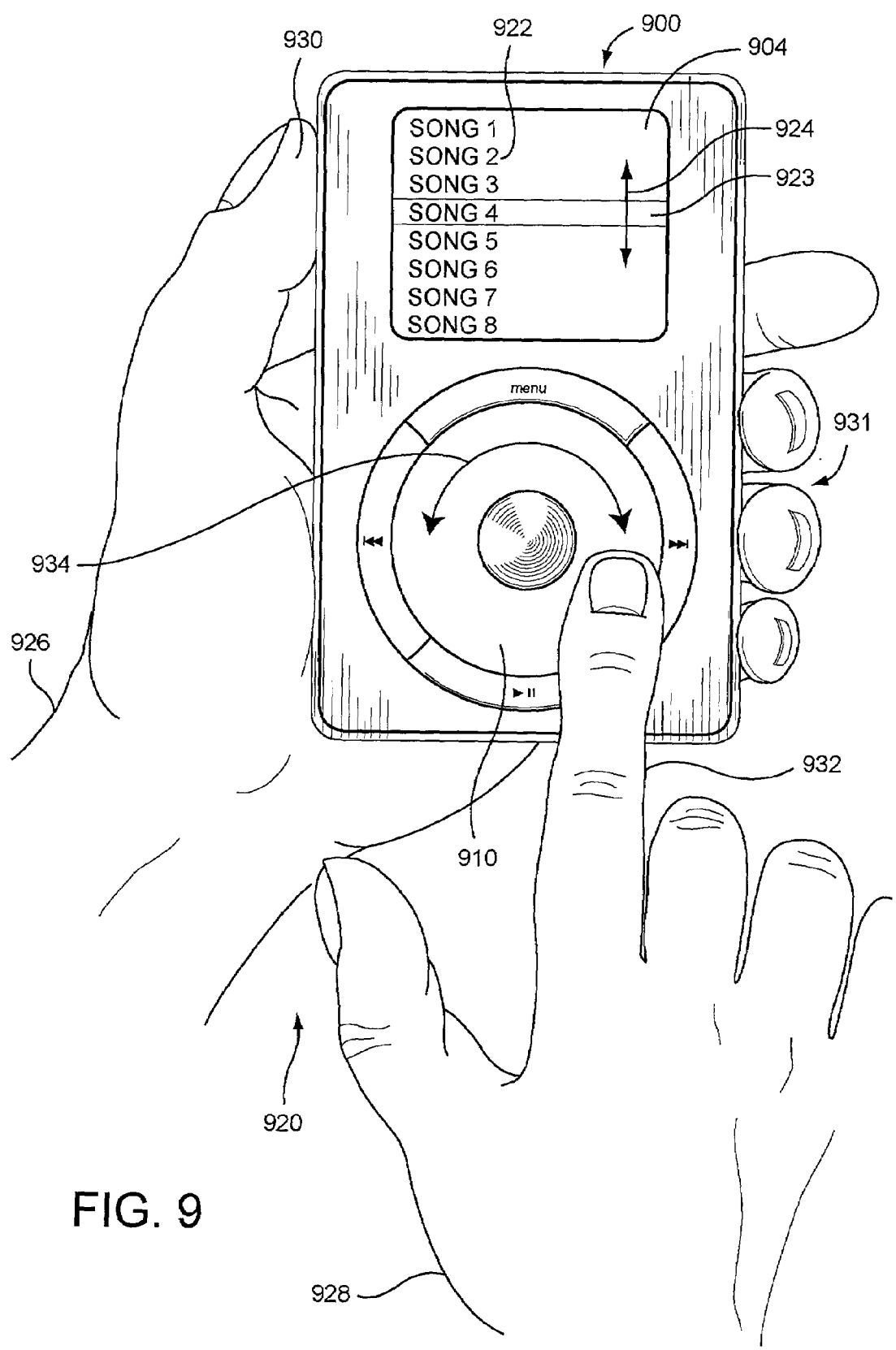
FIG. 9 shows the media player of FIG. 7B being used by a user in accordance with one embodiment of the invention.

FIG. 9 shows the media player 700 of FIG. 7B being used by a user 920 in accordance with one embodiment of the invention. In this embodiment, the user 920 is linearly scrolling (as shown by arrow 924) through a list of songs 922 displayed on the display screen 904 via a slider bar 923. As shown, the media device 900 is comfortably held in one hand 926 while being comfortably addressed by the other hand 928. This configuration generally allows the user 920 to easily actuate the rotational input device 910 with one or more fingers. For example, the thumb 930 and right-most fingers 931 (or left-most fingers if left handed) of the first hand 926 are used to grip the sides of the media player 900 while a finger 932 of the opposite hand 928 is used to actuate the rotational input device 910.

Referring to FIG. 9, and in accordance with one embodiment of the invention, the rotational input device 910 can be continuously actuated by a circular motion of the finger 932 as shown by arrow 934. For example, the finger may rotate relative to an imaginary axis. In particular, the finger can be rotated through 360 degrees of rotation without stopping. This form of motion may produce incremental or accelerated scrolling through the list of songs 922 being displayed on the display screen 904.

Figure 10A:
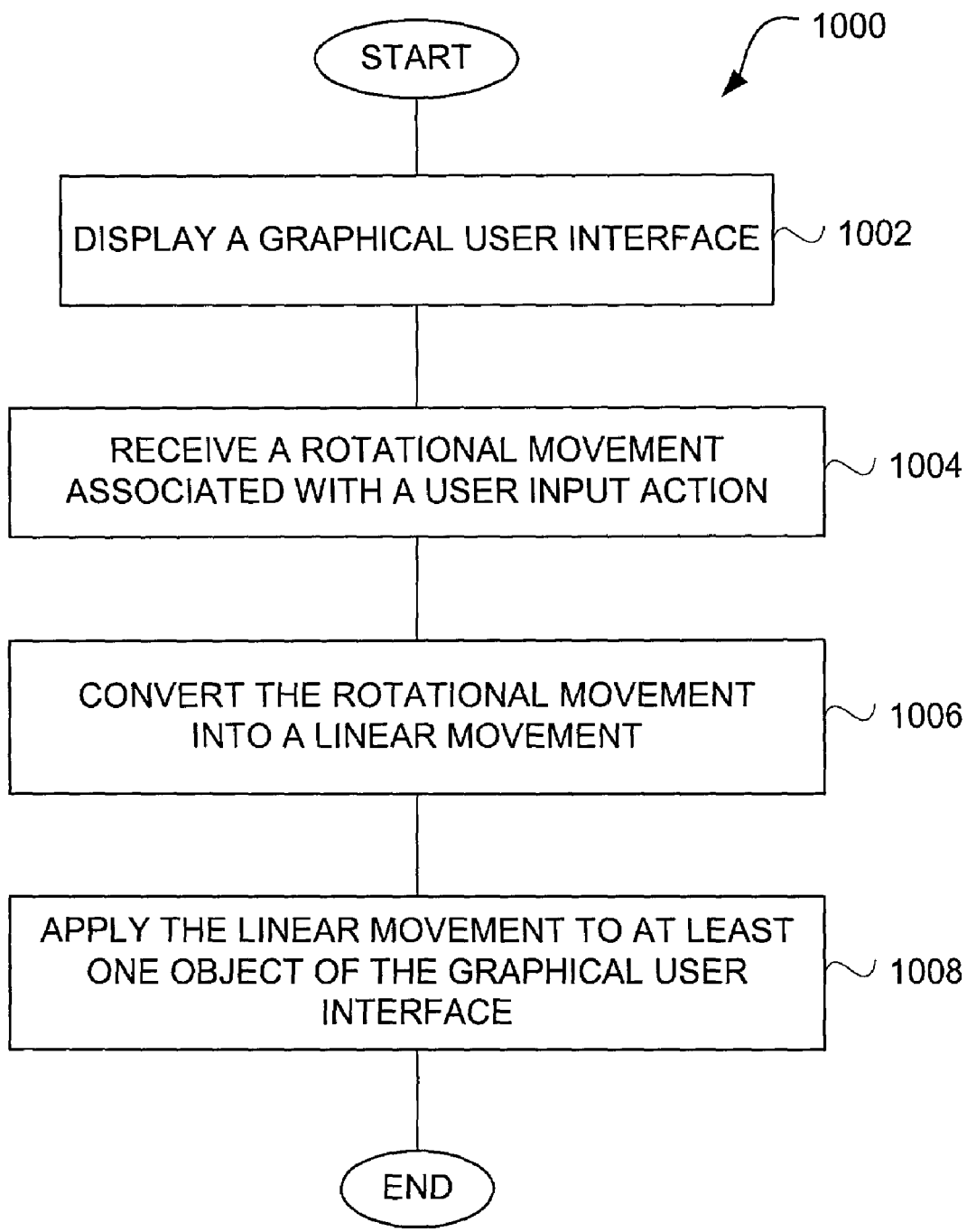
FIG. 10A is a flow diagram of user input processing according to one embodiment of the invention.

FIG. 10A is a flow diagram of user input processing 1000 according to one embodiment of the invention. The user input processing 1000 is, for example, performed with respect to the computer system 650 illustrated in FIG. 7A or the media player 700 illustrated in FIG. 7B.

The user input processing 1000 displays 1002 a graphical user interface. Then, a rotational movement associated with a user input action is received 1004. Here, the user input action is generally angular, as opposed to linear, and thus pertains to a rotational movement. As discussed in more detail below, the rotational movement can be provided by the user input action. In one example, the rotational movement can be caused by a user acting to rotate a navigational wheel through a user input action. In another example, the rotational movement can be caused by a user's finger or a stylist being moved in a rotational manner through a user input action with respect to a touch pad. After the rotational movement has been received 1004, the rotational movement is converted 1006 into a linear movement. The linear movement is then applied 1008 to at least one object of the graphical user interface. For example, the object of the graphical user interface can be a list, menu or other object having a plurality of selectable items. The linear movement can effect a scroll type action with respect to the object (e.g., list or menu). Alternatively, the linear movement can effect a level adjustment (e.g., volume adjustment) or position adjustment (e.g., slider bar position). After the linear movement has been applied 1008, the user input processing 1000 is complete and ends.

Figure 10B:
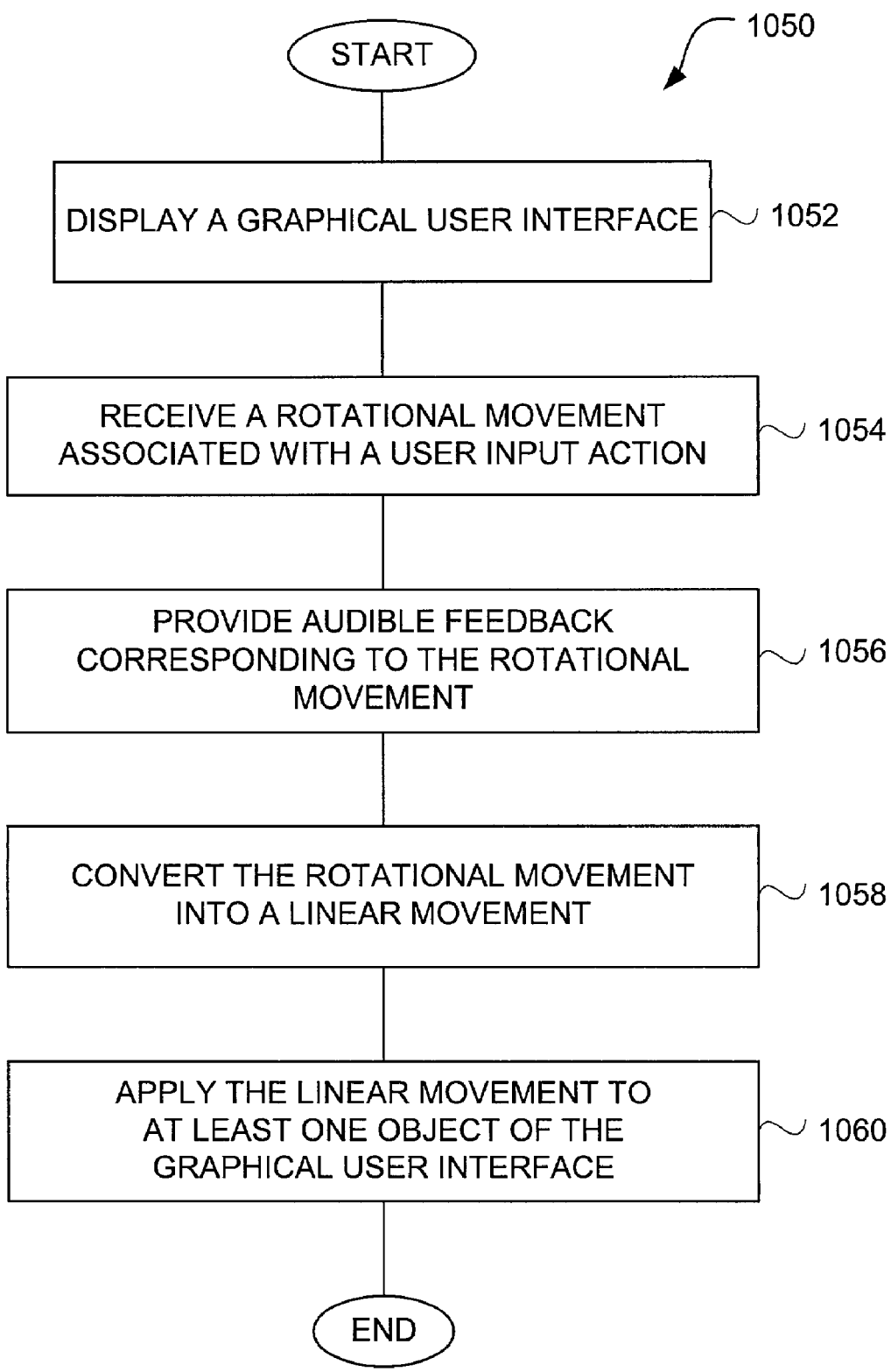
FIG. 10B is a flow diagram of user input processing according to another embodiment of the invention.

FIG. 10B is a flow diagram of user input processing 1050 according to another embodiment of the invention. The user input processing 1050 is, for example, performed with respect to the computer system 650 illustrated in FIG. 7A or the media player 700 illustrated in FIG. 7B.

The operations 1052-1060 performed by the user input processing 1050 are similar to those like operations performed by the user input processing 1000 illustrated in FIG. 10A. Additionally, the user input processing 1050 operates to provide 1056 audible feedback corresponding to the rotational movements. In other words, as the rotational movement associated with user input action is received 1054, audible feedback corresponding to the rotational movement is provided 1056. Such audible feedback provides the user with feedback concerning the extent to which rotational movement has been input. In one embodiment, the rotational movement associated with user input action is converted into linear movement and applied to an object of a graphical user interface. For example, when the object of the graphical user interface is a multi-item list that is displayed for user scrolling and selection actions, the rotational movement associated with the user input action represents a distance traversed in the multi-item list. When acceleration is applied, the distance traversed is increased (e.g., multiplied). In one embodiment, the audible feedback is provided through a piezoelectric buzzer that is controlled by a processor (or other circuitry). For example, the audio feedback unit 862 shown in FIG. 8B can be a piezoelectric buzzer. The controller for the piezoelectric buzzer can, for example, be a processor of the computer system 650 or the media player 700, or some other circuitry coupled to the piezoelectric buzzer.

Figure 11:
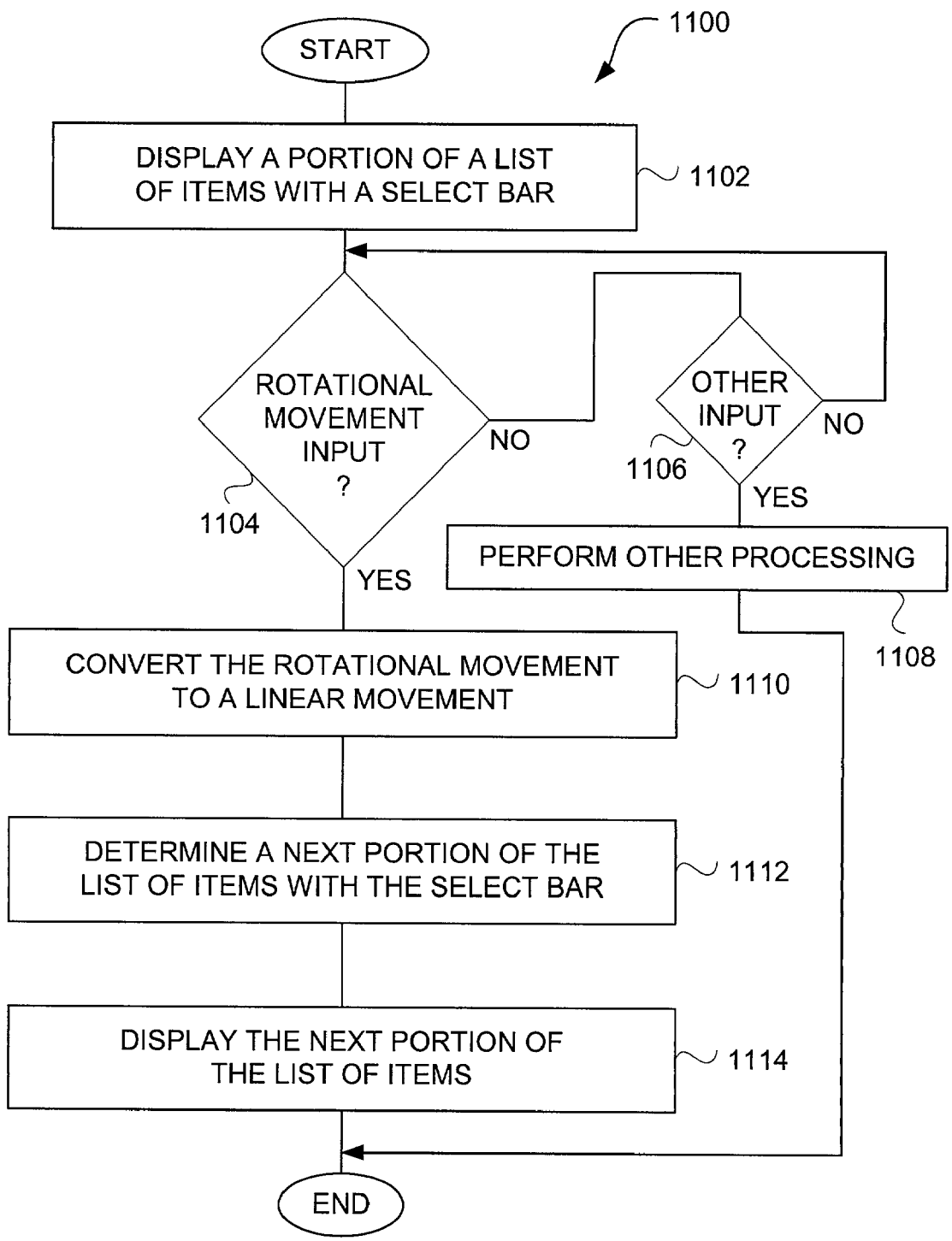
FIG. 11 is a flow diagram of user input processing according to another embodiment of the invention.

FIG. 11 is a flow diagram of user input processing 1100 according to another embodiment of the invention. The user input processing 1100 is, for example, performed by a computing device, such as the computer system 650 illustrated in FIG. 7A or the media player 700 illustrated in FIG. 7B.

The user input processing 1100 begins by the display 1102 of a portion of a list of items together with a select bar. The select bar typically points to or highlights one or more of the items of the list of items. In general, the select bar can be associated with any sort of visual indication specifying one or more of the items of the list of items. Hence, the select bar is one type of visual indicator. Next, a decision 1104 determines whether a rotational movement input has been received. When the decision 1104 determines that a rotational movement input has not yet been received, then a decision 1106 determines whether another input has been received. Here, the inputs are provided by a user of the computing device performing or associated with the user input processing 1100. When the decision 1106 determines that another input has been received, then other processing is performed 1108 to perform any operations or actions caused by the other input. Following the operation 1108, the user input processing 1100 is complete and ends. On the other hand, when the decision 1106 determines that no other input has been received, then the user input processing 1100 returns to repeat the decision 1104.

Once the decision 1104 determines that a rotational movement input has been received, then the rotational movement is converted 1110 to a linear movement. Then, a next portion of the list of items (and placement of the select bar over one of the items) is determined 1112. Thereafter, the next portion of the list of items is displayed 1114. The linear movement operates to move the select bar (or other visual identifier) within the list. In other words, the select bar is scrolled upwards or downwards (in an accelerated or unaccelerated manner) by the user in accordance with the linear motion. As the scrolling occurs, the portion of the list being displayed changes. Following the operation 1114, the user input processing 1100 is complete and ends. However, if desired, the user input processing 1100 can continue following operation 1114 by returning to the decision 1104 such that subsequent rotational movement inputs can be processed to view other portions of the list items in a similar manner.

Figure 12:
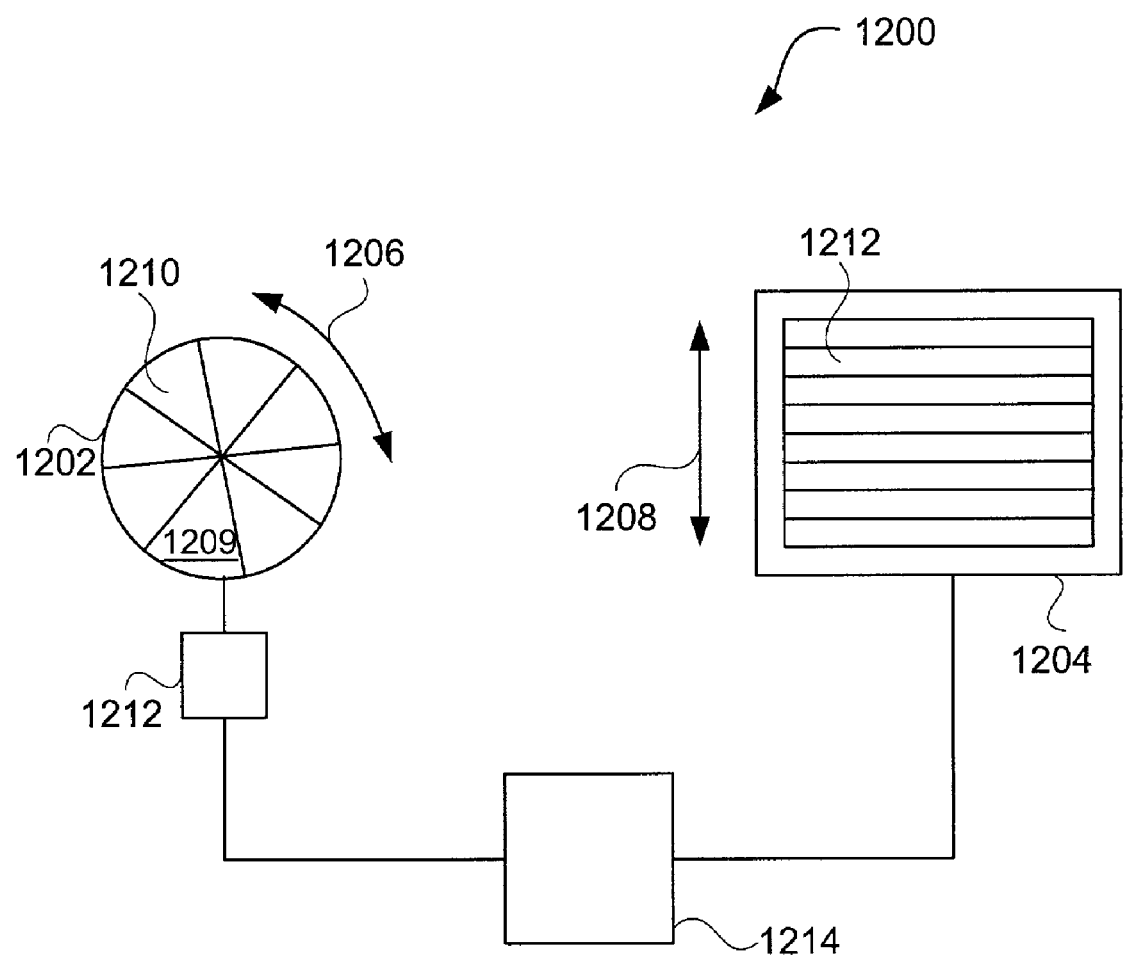
FIG. 12 is a block diagram of a rotary input display system in accordance with one embodiment of the invention.

FIG. 12 is a block diagram of a rotary input display system 1200 in accordance with one embodiment of the invention. By way of example, the rotary input display system 1200 can be performed by a computing device, such as the computer system 650 illustrated in FIG. 7A or the media player 700 illustrated in FIG. 7B. The rotary input display system 1200 utilizes a rotational input device 1202 and a display screen 1204. The rotational input device 1202 is configured to transform a rotational motion 1206 by a user input action (e.g., a swirling or whirling motion) into translational or linear motion 1208 on the display screen 1204. In one embodiment, the rotational input device 1402 is arranged to continuously determine either the angular position of the rotational input device 1202 or the angular position of an object relative to a planar surface 1209 of the rotational input device 1202. This allows a user to linearly scroll through a media list 1211 on the display screen 1204 by inducing the rotational motion 1206 with respect to the rotational input device 1202.

The rotary input display system 1200 also includes a control assembly 1212 that is coupled to the rotational input device 1202. The control assembly 1212 is configured to acquire the position signals from the sensors and to supply the acquired signals to a processor 1214 of the system. By way of example, the control assembly 1212 may include an application-specific integrated circuit (ASIC) that is configured to monitor the signals from the sensors to compute the angular location and direction (and optionally speed and acceleration) from the monitored signals and to report this information to the processor 1214.

The processor 1214 is coupled between the control assembly 1212 and the display screen 1204. The processor 1214 is configured to control display of information on the display screen 1204. In one sequence, the processor 1214 receives angular motion information from the control assembly 1212 and then determines the next items of the media list 1211 that are to be presented on the display screen 1204. In making this determination, the processor 1214 can take into consideration the length of the media list 1211. Typically, the processor 1214 will determine the rate of movement such that the transitioning to different items in the media list 1211 can be performed faster or in an accelerated manner when moved at non-slow speeds or proportional with greater speeds. In effect, to the user, rapid rotational motion causes faster transitioning through the list of media items 1211. Alternatively, the control assembly 1212 and processor 1214 may be combined in some embodiments.

Although not shown, the processor 1214 can also control a buzzer to provide audio feedback to a user. The audio feedback can, for example, be a clicking sound produced by a buzzer 1216. In one embodiment, the buzzer 1216 is a piezoelectric buzzer. As the rate of transitioning through the list of media items increases, the frequency of the clicking sounds increases. Alternatively, when the rate of transitioning slows, the frequency of the clicking sounds correspondingly slows. Hence, the clicking sounds provide audio feedback to the user as to the rate in which the media items within the list of media items are being traversed.

The various aspects, features or embodiments of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that a user is able to traverse through a displayed list of items using a rotational user input action. Another advantage of the invention is that a user is able to easily and rapidly traverse a lengthy list of items. Still another advantage of the invention is the rate of traversal of the list of media items can be dependent on the rate of rotation of a dial (or navigation wheel). Yet still another advantage of the invention is that audible sounds are produced to provide feedback to users of their rate of traversal of the list of media items.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for scrolling through portions of a data set to be displayed on a portable media player having a display device, the portable media player having a rotational input device, said method comprising:
   receiving a number of units associated with a rotational user input, the rotational user input being provided by a user through interaction with the rotational input device;
   determining an acceleration factor pertaining to the rotational user input;
   modifying the number of units by the acceleration factor;
   determining a next portion of the data set based on the modified number of units; and
   presenting the next portion of the data set,
   wherein as the interaction with the rotational input device occurs, the display device provides visual feedback for the user of the portable media player, and
   wherein as the interaction with the rotational input device occurs, audio feedback and the visual feedback are provided for the user of the portable media player.

2. A method as recited in claim 1, wherein the data set pertains to a list of items, and the portions of the data set include one or more of the items.

3. A method as recited in claim 1, wherein the data set pertains to a media file, and the portions of the data set pertain to one or more sections of the media file.

4. A method as recited in claim 3, wherein the media file is an audio file.

5. A method as recited in claim 1, wherein the rotational user input is a touch pad.

6. A method as recited in claim 5, wherein the touch pad is a circular touch pad.

7. A method as recited in claim 1, wherein the acceleration factor is dependent upon a rate of speed for the rotational user input.

8. A method as recited in claim 1, wherein the acceleration factor provides a range of acceleration.

9. A method as recited in claim 1, wherein the acceleration factor can successively increase to provided successively greater levels of acceleration.

10. A method as recited in claim 1, wherein said determining of the next data portion comprises:
    converting the modified number of units into the next portion based on a predetermined value.

11. A method as recited in claim 1, wherein said determining of the next data portion comprises:
    dividing the modified number of units by a chunking value.

12. A method as recited in claim 1, wherein said determining of the next data portion comprises:
    adding a prior remainder value to the modified number of units; and
    converting the modified number of units into the next portion.

13. A method for scrolling through portions of a data set to be displayed on a portable media player having a display device, the portable media player having a rotational input device, said method comprising:
    (a) receiving a number of units from the rotational input device, the number of units being associated with a rotational user input being provided by a user through interaction with the rotational input device;
    (b) determining a speed of rotation for the rotational input device;
    (c) applying acceleration when the speed of rotation is greater than a speed threshold;
    (d) removing any acceleration being applied when the speed of rotation is less then the speed threshold;
    (e) modifying the number of units in accordance with the acceleration, if any;
    (f) determining a next portion of the data set based on the modified number of units; and
    (g) presenting the next portion of the data set,
    wherein as the interaction with the rotational input device occurs, the display device provides visual and/or audible feedback for the user of the portable media player, and
    wherein as the interaction with the rotational input device occurs, audio feedback and the visual feedback are provided for the user of the portable media player.

14. A method as recited in claim 13, wherein said applying (c) of the acceleration successively increases an amount of acceleration being applied.

15. A method as recited in claim 14, wherein said applying (c) comprises:
    (c1) obtaining a current acceleration amount being applied for a previous number of units from the rotational input device; and (c2) determining an increased acceleration amount to be applied to a current number of units from the rotational input device.

16. A method as recited in claim 15, wherein the increased acceleration amount is an integer multiple of the current acceleration amount.

17. A method as recited in claim 15, wherein said applying (c) further comprises:
(c3) determining whether the time since the acceleration was last changed is greater than a duration threshold; and
(c4) preventing said applying of the acceleration or the increased acceleration amount when the time since the acceleration was last changed is not greater than the duration threshold.

18. A method as recited in claim 13, wherein said applying (c) comprises:
(c1) determining whether the time since the acceleration was last changed is greater than a duration threshold; and
(c2) preventing said applying of the acceleration when the time since the acceleration was last changed is not greater than the duration threshold.

19. A method as recited in claim 13, wherein said determining (f) of the next data portion comprises:
(f1) converting the modified number of units into the next portion based on a predetermined value.

20. A method as recited in claim 13, wherein said determining (f) of the next data portion comprises:
(f1) dividing the modified number of units by a chunking value.

21. A method as recited in claim 13, wherein said determining (f) of the next data portion comprises:
(f1) adding a prior remainder value to the modified number of units; and
(f2) converting the modified number of units into the next portion.

22. A method as recited in claim 1, wherein the data set pertains to a list of items, and wherein one of the items on the list of items is distinguishly displayed from the other items in the list of items based on the rotational user input, thereby providing the visual feedback.

23. A method as recited in claim 13, wherein the next portion of the data set pertains to a list of items, and wherein, said presenting (g) of the next portion causes one of the items on the list of items to be distinguishly displayed from the other items in the list of items based on the rotational user input, thereby providing the visual feedback.

24. A method for scrolling through portions of a data set to be displayed on a portable media player having a display device, the portable media player having a rotational input device, said method comprising:
receiving a number of units associated with a rotational user input, the rotational user input being provided by a user through interaction with the rotational input device;
determining a multiplier pertaining to the rotational user input;
modifying the number of units by the multiplier;
determining a next portion of the data set based on the modified number of units; and
presenting the next portion of the data set,
wherein as the interaction with the rotational input device occurs, visual feedback conelated to the rotational user input is provided on the display device for the user of the portable media player, and
wherein as the interaction with the rotational input device occurs, audio feedback and the visual feedback are provided for the user of the portable media player.

25. A method as recited in claim 24, wherein the rotational user input is a touch pad.

26. A method as recited in claim 25, wherein the touch pad is a circular touch pad.

27. A method as recited in claim 25, wherein the multiplier is dependent upon a rate of speed for the rotational user input.

28. A method for scrolling through portions of a data set to be displayed on a portable media player having a display device, the portable media player having a rotational input device, said method comprising:
receiving a number of units associated with a rotational user input, the rotational user input being provided by a user through interaction with the rotational input device;
determining a multiplier pertaining to the rotational user input;
modifying the number of units by the multiplier;
determining a next portion of the data set based on the modified number of units; and
presenting the next portion of the data set,
wherein as the interaction with the rotational input device occurs, visual feedback correlated to the rotational user input is provided on the display device for the user of the portable media player, and
wherein the multiplier can successively increase to provided successively greater levels of acceleration.

29. A computer readable medium including at least computer program code for scrolling through portions of a data set to be displayed on a portable media player having a display device, the portable media player having a rotational input device, said computer readable medium comprising:
computer program code for receiving a number of units associated with a rotational user input, the rotational user input being provided by a user through interaction with the rotational input device;
computer program code for determining an acceleration factor pertaining to the rotational user input;
computer program code for modifying the number of units by the acceleration factor;
computer program code for determining a next portion of the data set based on the modified number of units; and
computer program code for presenting the next portion of the data set,
wherein as the interaction with the rotational input device occurs, the display device provides visual feedback for the user of the portable media player, and
wherein as the interaction with the rotational input device occurs, audio feedback and the visual feedback are provided for the user of the portable media player.

30. A computer readable medium as recited in claim 29, wherein the data set pertains to a list of items, and the portions of the data set include one or more of the items.

31. A computer readable medium including at least computer program code for scrolling through portions of a data set to be displayed on a portable media player having a display device, the portable media player having a rotational input device, said computer readable medium comprising:
computer program code for receiving a number of units associated with a rotational user input, the rotational user input being provided by a user through interaction with the rotational input device;
computer program code for determining an acceleration factor pertaining to the rotational user input;

computer program code for modifying the number of units by the acceleration factor;

computer program code for determining a next portion of the data set based on the modified number of units; and computer program code for presenting the next portion of the data set, wherein as the interaction with the rotational input device occurs, the display device provides visual feedback for the user of the portable media player, and wherein the data set pertains to a media file, and the portions of the data set pertain to one or more sections of the media file.

32. A computer readable medium as recited in claim 31, wherein the media file is an audio file.

33. A computer readable medium as recited in claim 29, wherein the rotational user input is a touch pad.

34. A computer readable medium as recited in claim 33, wherein the touch pad is a circular touch pad.

35. A computer readable medium as recited in claim 29, wherein the acceleration factor is dependent upon a rate of speed for the rotational user input.

36. A computer readable medium as recited in claim 29, wherein the acceleration factor provides a range of acceleration.

37. A computer readable medium as recited in claim 29, wherein the acceleration factor can successively increase to provided successively greater levels of acceleration.

38. A computer readable medium as recited in claim 29, wherein said computer program code for determining of the next data portion comprises:

computer program code for converting the modified number of units into the next portion based on a predetermined value.

39. A computer readable medium as recited in claim 29, wherein said computer program code for determining of the next data portion comprises:

computer program code for dividing the modified number of units by a chunking value.

40. A computer readable medium as recited in claim 29, wherein said computer program code for determining of the next data portion comprises:

computer program code for adding a prior remainder value to the modified number of units; and computer program code for converting the modified number of units into the next portion.

* * * * *

UNITED STATES PATENT AND TRADEMARK OFFICE
CERTIFICATE OF CORRECTION

| | | |
|---|---|---|
| PATENT NO. | : 7,312,785 B2 | Page 1 of 1 |
| APPLICATION NO. | : 10/256716 | |
| DATED | : December 25, 2007 | |
| INVENTOR(S) | : Tsuk et al. | |

It is certified that error appears in the above-identified patent and that said Letters Patent is hereby corrected as shown below:

Title page, page 4, after "OTHER PUBLICATIONS", insert:

--"About Quicktip ®," www.logicad3d.com/docs/qt.html, downloaded April 8, 2002.--

Signed and Sealed this

Thirty-first Day of March, 2009

JOHN DOLL
*Acting Director of the United States Patent and Trademark Office*